US011361677B1

(12) United States Patent
Alhalabi

(10) Patent No.: US 11,361,677 B1
(45) Date of Patent: Jun. 14, 2022

(54) SYSTEM FOR ARTICULATION TRAINING FOR HEARING IMPAIRED PERSONS

(71) Applicant: King Abdulaziz University, Jeddah (SA)

(72) Inventor: Wadee Saleh Ahmed Alhalabi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/523,375

(22) Filed: Nov. 10, 2021

(51) Int. Cl.
*G09B 21/00* (2006.01)
*G10L 25/24* (2013.01)
*G10L 21/10* (2013.01)

(52) U.S. Cl.
CPC ............ *G09B 21/009* (2013.01); *G10L 21/10* (2013.01); *G10L 25/24* (2013.01)

(58) Field of Classification Search
CPC ........ G10L 25/24; G10L 21/10; G09B 21/009
See application file for complete search history.

(56) References Cited

U.S. PATENT DOCUMENTS

2021/0383722 A1\* 12/2021 Stevens ................ G09B 21/009

FOREIGN PATENT DOCUMENTS

| CN | 100397438 C | 6/2008 |
| CN | 1851779 B | 4/2010 |
| CN | 102663928 A | 9/2012 |

OTHER PUBLICATIONS

Barua et al., "Neural network based recognition of speech using MFCC features," 2014 International Conference on Informatics, Electronics & Vision (ICIEV), 2014, pp. 1-6, doi: 10.1109/ICIEV.2014.6850680. (Year: 2014).*

Murthy et al., "Pronunciation Training on Isolated Kannada Words Using "Kannada Kali"—A Cloud Based Smart Phone Application," 2018 IEEE International Conference on Cloud Computing in Emerging Markets (CCEM), 2018, pp. 57-64, doi: 10.1109/CCEM.2018.00017. (Year: 2018).*

(Continued)

*Primary Examiner* — Michelle M Koeth
(74) *Attorney, Agent, or Firm* — Oblon, McClelland, Maier & Neustadt, L.L.P.

(57) ABSTRACT

A computing device, method, and a non-transitory computer readable medium for articulation training for hearing impaired persons is disclosed. The computing device comprises a database including stored mel-frequency cepstral representations of audio recordings associated with text and/or images related to the audio recordings, a microphone configured to receive audible inputs and a display. The computing device is operatively connected to the database, the microphone and the display. The computing device includes circuitry and program instructions stored therein which when executed by one or more processors, cause the system to receive an audible input from the microphone, convert the audible input to a mel-frequency cepstral representation, search the database for a match of the mel-frequency cepstral representation to a stored mel-frequency cepstral representation and display the text and/or images related to the stored mel-frequency cepstral representation when the match is found.

3 Claims, 19 Drawing Sheets

(56) References Cited

OTHER PUBLICATIONS

Moline et al., "Covering all the bases: Duolingo's approach to speaking skills," Duolingo Blog, Oct. 29, 2020, 10 pages, (accessible at https://blog.duolingo.com/covering-all-the-bases-duolingos-approach-to-speaking-skills/, last accessed Jan. 25, 2022). (Year: 2020).*

Sama, "Practice Your American English Pronunciation With ELSA Speak," Inenglishwithlove.com Blog, Feb. 10, 2021, 36 pages, (accessible at https://www.inenglishwithlove.com/blog/practice-american-pronunciation-with-elsa, last accessed Jan. 25, 2022). (Year: 2021).*

Nandal et al., "Pronunciation Accuracy Calculator using Machine Learning," 2021 5th International Conference on Computing Methodologies and Communication (ICCMC), Apr. 2021, pp. 1128-1133, doi: 10.1109/ICCMC51019.2021.9418381. (Year: 2021).*

Bogach et al., "Speech Processing for Language Learning: A Practical Approach to Computer-Assisted Pronunciation Teaching," Jan. 2021, MDPI, Electronics 2021,10(3):235, doi: 10.3390/electronics10030235. (Year: 2021).*

Meisarah, "Mobile-Assisted Pronunciation Training: The Google Play Pronunciation and Phonetics Application," Oct. 2020, 5, 70-88, doi: 10.24903/sj.v5i2.487. (Year: 2020).*

Ramón Garcia Gómez, et al., "Speech Training for Deaf and Hearing-Impaired People", Conference: Sixth European Conference on Speech Communicaton and Technology, EUROSPEECH, Jan. 1999, 4 pages.

S. Elavarasi, et al. "MFCC Using Speech Recognition in Computer Applications for Deaf", International Journal of Recent Technology and Engineering (IJRTE), vol. 8, Issue 2S11, Sep. 2019, pp. 217-224.

"Deaf-Mute Communication Helper", Route One Consulting PTE Ltd, https://apps.apple.com/us/app/deaf-mute-communication-helper/id1514091454, Mar. 31, 2021, 3 pages.

* cited by examiner

SYSTEM FOR ARTICULATION TRAINING FOR HEARING IMPAIRED PERSONS

STATEMENT OF ACKNOWLEDGEMENT

The inventors extend their appreciation to the Deputyship for Research and Innovation, Ministry of Education in Saudi Arabia for funding this research work through the project number 2021-017 and King Abdulaziz University, DSR, Jeddah, Saudi Arabia.

BACKGROUND

Technical Field

The present disclosure relates to a system and methods for articulation training for hearing impaired persons.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Specially abled individuals, such as individuals having hearing impairment or deafness, and/or mute persons often face challenges interacting with non-hearing impaired individuals. One such reason is due to a lack of ability to communicate verbally. An individual having hearing impairment or deafness may not be able to speak clearly even if the individual does not have vocal chord damage. The ability to speak may depend on the ability to hear. For such individuals having hearing impairment or deafness, sign language is a primary means for communication. As a result, such individuals are required to learn sign language in order to communicate with others. However, non-hearing impaired people often do not know sign language, making it difficult for the hearing impaired to communicate with or understand others As a result, the individuals may feel left out or marginalized, and it may be difficult to integrate the individuals having hearing impairment into the mainstream of society.

There are many existing devices, applications, and programs in the market which are designed to teach sign language. One example of a conventional teaching application is illustrated in FIG. 1(a) mobile application is provided that teaches sign language by displaying hand signs and converts spoken language from a normally hearing person into a sign language that the hearing impaired individual can read and understand. For example, FIG. 1(a) illustrates a screen of the mobile application for a guest login 102. The mobile application is configured to convert Arabic or English speech to Arabic sign language using resources on a cloud network. FIG. 1(b) illustrates functionalities provided by the mobile application, such as a speech to sign function 104, an optical character recognition (OCR) function 106, a bar code reader 108, and a sign language learning 110. FIG. 1(c) illustrates the OCR function 106 for images (that could be taken from a camera 112) or objects from a file 114, such as, stored images or a content file. FIG. 1(d) illustrates the mobile application providing an animated character 116 enacting a Arabic sign language corresponding to an Arabic or English speech. However, this invention does not help hearing impaired individuals to learn and/or practice speech.

A conventional wearable device 200 is shown in FIG. 2 (See: Boon-Giin Lee, Su Min Lee., "Smart Wearable Hand Device for Sign Language Interpretation System With Sensors Fusion", 2018; IEEE, incorporated herein by reference in its entirety). The wearable device 200 includes sensors configured to interpret sign language. The wearable device 200 includes flex sensor 202, finger holder 204, a 3D-printed wearable device 206, a bluetooth module 208, an andriod application program interface (API) 210 and inertial motor unit 212. The individual may have to wear the wearable device 200 to make signs as per the sign language which is then interpreted by the wearable device 200. However, this invention does not help hearing impaired individuals to learn and/or practice speech.

FIG. 3 illustrates a conventional virtual reality device (VR) 300 for hearing impaired individuals (See: Mohammadreza Mirzaei, Peter Kan, Hannes Kaufmann, "EarVR: Using Ear Haptics in Virtual Reality for Deaf and Hard-of-Hearing People,", May 2020; IEEE Trans Vis Comput Graph, incorporated herein by reference in its entirety). The VR device 300 is configured to analyze 3D sounds in a VR environment and to locate a direction of a sound source that is closest to an individual. The VR device 300 notifies the individual about the sound direction using placed on the user's ears includes two vibro-motors. However, this device does not help hearing impaired individuals to learn and/or practice speech.

FIG. 4 illustrates a conventional ring-shaped wearable device 400 (See: R. Xie, X. Sun, X. Xia and J. Cao, "Similarity Matching-Based Extensible Hand Gesture Recognition," June 2015, *IEEE Sensors Journal*, vol. 15, no. 6, pp. 3475-3483, incorporated herein by reference in its entirety). The ring-shaped wearable device 400 includes an accelerometer to sense the 2-D gestures of a wearer in 2-D space. This ring-shaped wearable device 400 interprets sign language made by the wearer. However, this invention does not help hearing impaired individuals to learn and/or practice speech.

FIG. 5A illustrates a conventional hearing impaired communication interpreter 500 (See: Rajamohan, Anbarasi & Hemavathy, R. & Dhanalakshmi, Munirathnam, "Deaf-Mute Communication Interpreter", 2012, International Journal of Scientific Engineering and Technology. 2. 2277-1581, incorporated herein by reference in its entirety). The hearing impaired communication interpreter 500 includes a glove-based hearing impaired communication interpreter device and a mobile application coupled to the interpreter device. The glove is internally equipped with five flex sensors, tactile sensors and an accelerometer. The glove is configured to identify the gestures. The hearing impaired communication interpreter includes a text to speech conversion (TTS) module that translates the identified gestures to voice. Further, the hearing impaired communication interpreter 500 is configured to convert the voice to text message and Braille. However, this invention does not help hearing impaired individuals to learn and/or practice speech and requires a glove to receive the sign language gestures.

FIG. 5B illustrates a conventional computer application by Yousaf et al., 2018 (See: Yousaf, Kanwal & Mehmood, Zahid & Saba, Tanzila & Rehman, Amjad & Rashid, Muhammad & Altaf, Muhammad & Shuguang, Zhang, "A Novel Technique for Speech Recognition and Visualization Based Mobile Application to Support Two-Way Communication between Deaf-Mute and Normal Peoples", 2018, Wireless Communications and Mobile Computing, incorporated herein by reference in its entirety). The computer application is referred to as a vocalizer to mute (V2M), and is designed to establish communication among blind, deaf and mute people. The application, in a first mode, captures a clear speech, for example, from a blind person and converts the speech into a sign language form to be read by a deaf and mute person. The computer application uses an automatic speech recognition (ASR) methodology to recognize the speech of a hearing impaired individual and converts it into a recognizable form of speech for a non-hearing impaired person. In another mode, the application receives a sign language from a hearing impaired person and converts it into either a readable text form or an audible form for hearing imparied individuals or blind individuals, respectively. FIG. 5C illustrates the application receiving a sign language and converting the sign language to speech. While this may help communication between a hearing impaired person and a blind person, it is not helpful in training a hearing impaired person to learn and/or practice speech.

A conventional computer application that converts speech to text has been described by Rastogi et al. (See: R. Rastogi, S. Mittal and S. Agarwal, "A novel approach for communication among Blind, Deaf and Dumb people," 2015, 2nd International Conference on Computing for Sustainable Global Development (INDIACom), pp. 605-610). However, the computer application requires clear speech to convert the speech to text.

Conventional mobile applications or devices available in the market are designed to convert language from a hearing and speaking person to sign language in order to support the hearing impaired to communicate with others in the society by sign language. However, the hearing impaired individuals may not be able to communicate back with people by using sign language because many non-hearing impaired people do not know sign language. Additionally, sign language communication, although useful, does not train a hearing impaired person to speak more clearly. Research has shown that if a hearing impaired individual, who is not able to speak clearly, is provided with articulation training, the hearing impaired individual can communicate very well in his/her social life. As such, there exists a need for a device or a method that could help the individuals having hearing impairment to pronounce, articulate and read without the need of sign language, thereby enabling the individuals having hearing impairment to use their voices in addition to the sign language.

Accordingly, it is one object of the present disclosure to provide methods and systems for articulation training for hearing impaired individuals, which recognizes the speech of the hearing impaired person and converts the speech to text.

SUMMARY

According to an exemplary embodiment, a system for articulation training for hearing impaired persons is disclosed. The system comprises a database including stored mel-frequency cepstral representations of audio recordings associated with text and/or images related to the audio recordings, a microphone configured to receive audible inputs, a display, and a computing device operatively connected to the database, the microphone, and the display. The computing device includes circuitry and program instructions stored therein which when executed by one or more processors, cause the system to receive an audible input from the microphone, convert the audible input to a mel-frequency cepstral representation, search the database for a match of the mel-frequency cepstral representation to a stored mel-frequency cepstral representation and display the text and/or images related to the stored mel-frequency cepstral representation when the match is found.

According to another exemplary embodiment, a method of articulation training for hearing impaired persons is disclosed. The method includes receiving an audible input and converting the audible input to a mel-frequency cepstral representation. The method further includes searching for a match of the mel-frequency cepstral representation to a stored mel-frequency cepstral representation. The method further includes displaying the text and/or images related to the stored mel-frequency cepstral representation when the match is found.

According to one more exemplary embodiment, a mobile web application for articulation training for hearing impaired persons is disclosed. The mobile web application comprises a program instructions, which when stored in a memory of a computing device including circuitry, a database, a microphone, and a speaker, and executed by one or more processors, cause the mobile web application to receive an audible input from the microphone, convert the audible input to a mel-frequency cepstral representation, search the database for a match of the mel-frequency cepstral representation to a stored mel-frequency cepstral representation, and cause the computing device to display the text and/or images related to the stored mel-frequency cepstral representation and store the mel-frequency cepstral representation with the stored mel-frequency cepstral representations in the database when the match is found.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figures 1, 2:
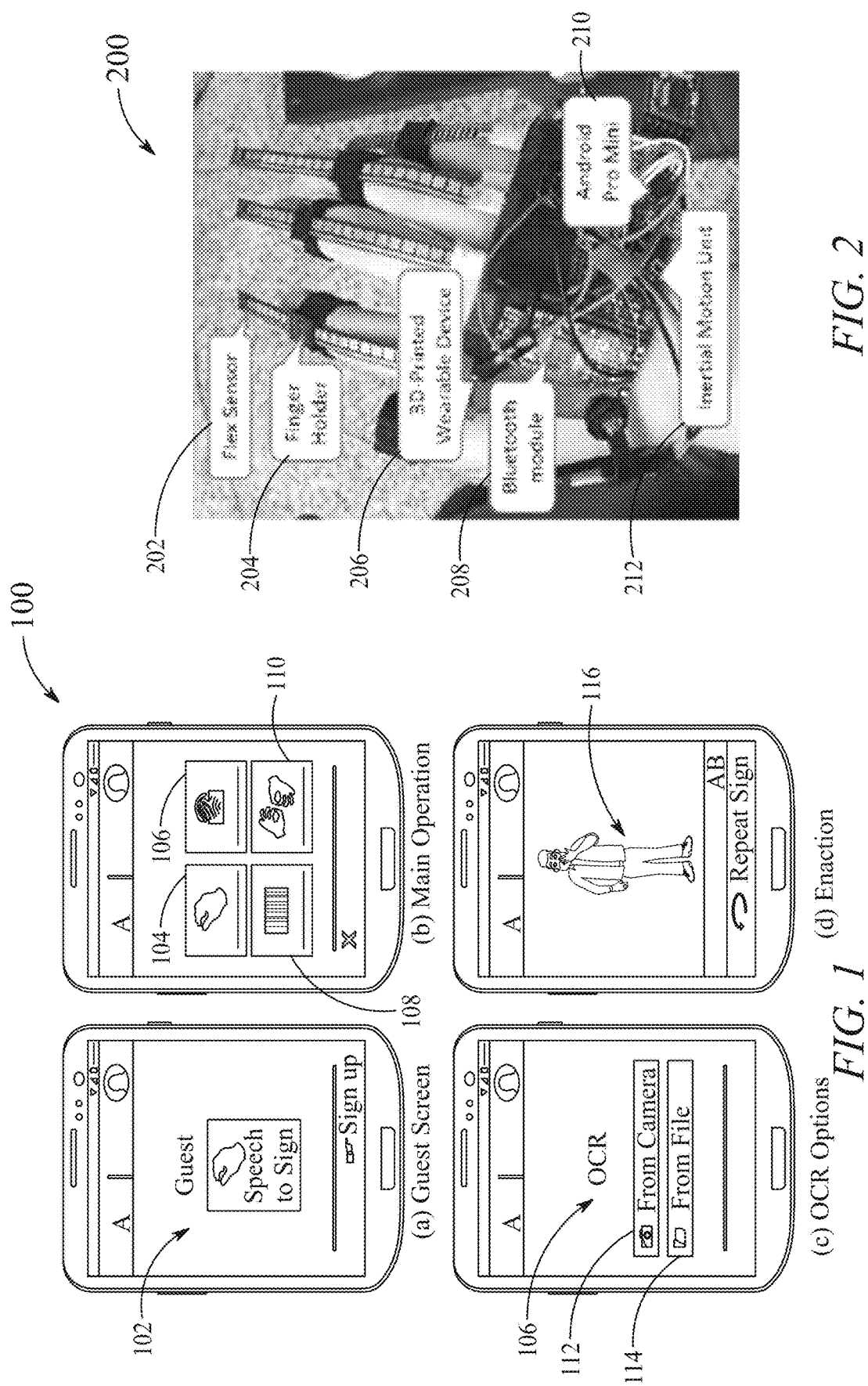
FIG. 1 is a graphical screenshot of a mobile application available in the market for helping a hearing impaired person to learn or understand a sign language, where a) is a sign-in screen, b) is an option selection screen, c) is an optical character recognition (OCR) function screen, and d) is screen showing animated character enacting a sign language.
FIG. 2 is a wearable device configured for sign language interpretation.
Figure 3:
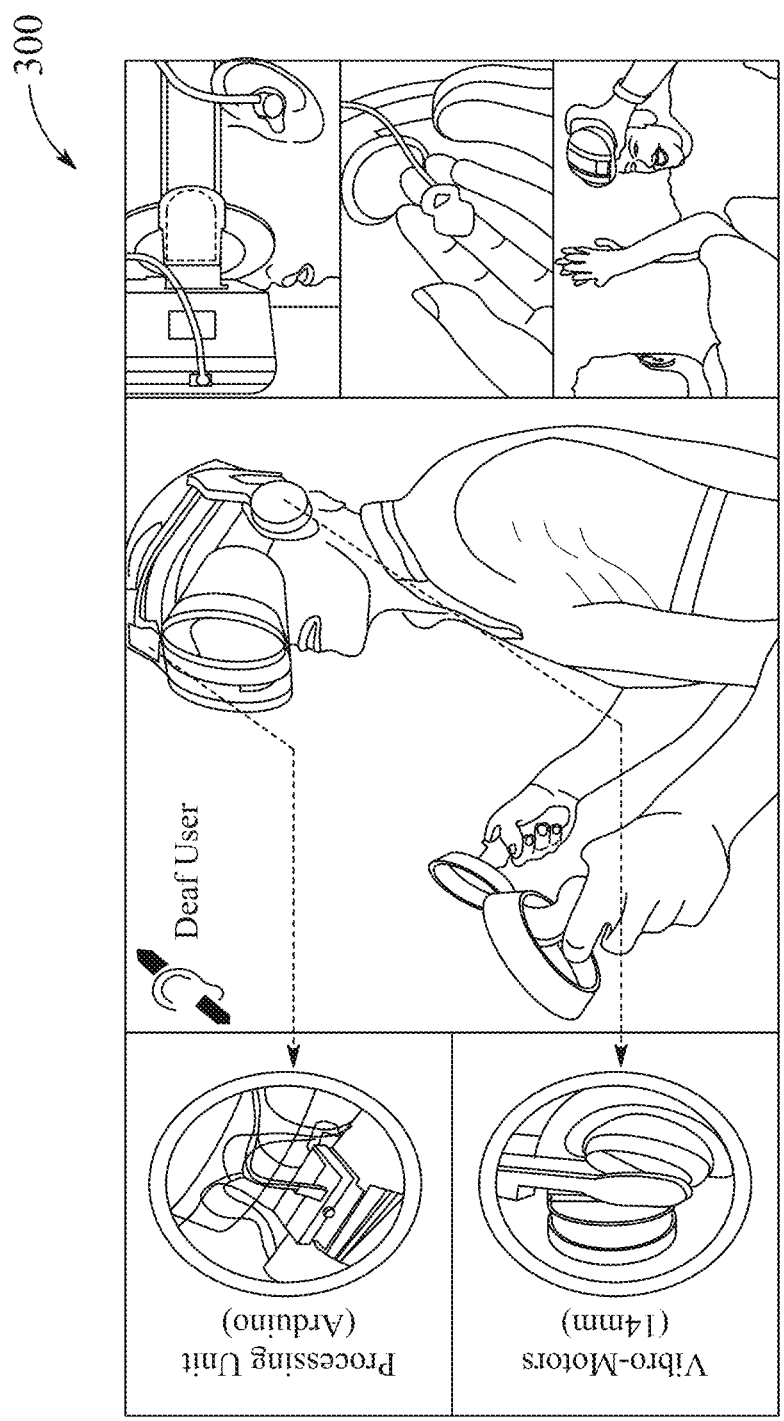
FIG. 3 is a virtual reality device configured to provide textual information based on image recognition.
Figure 4:
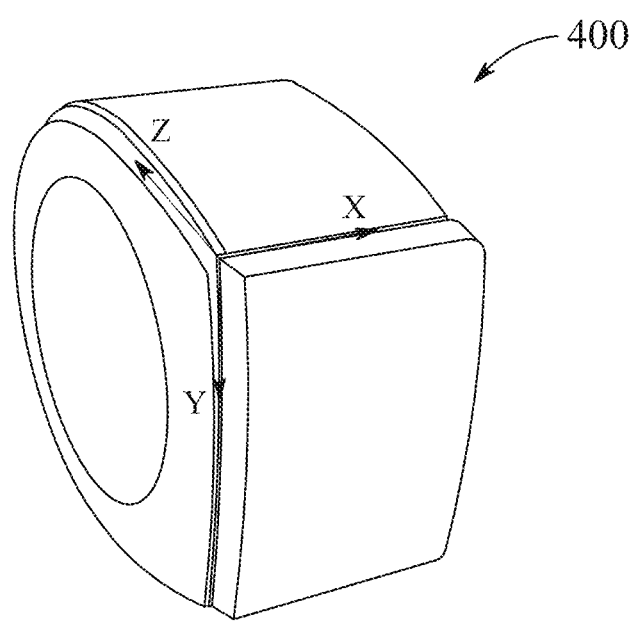
FIG. 4 is a ring-shaped wearable device configured to interpret a sign language made by a wearer.
Figure 5A:
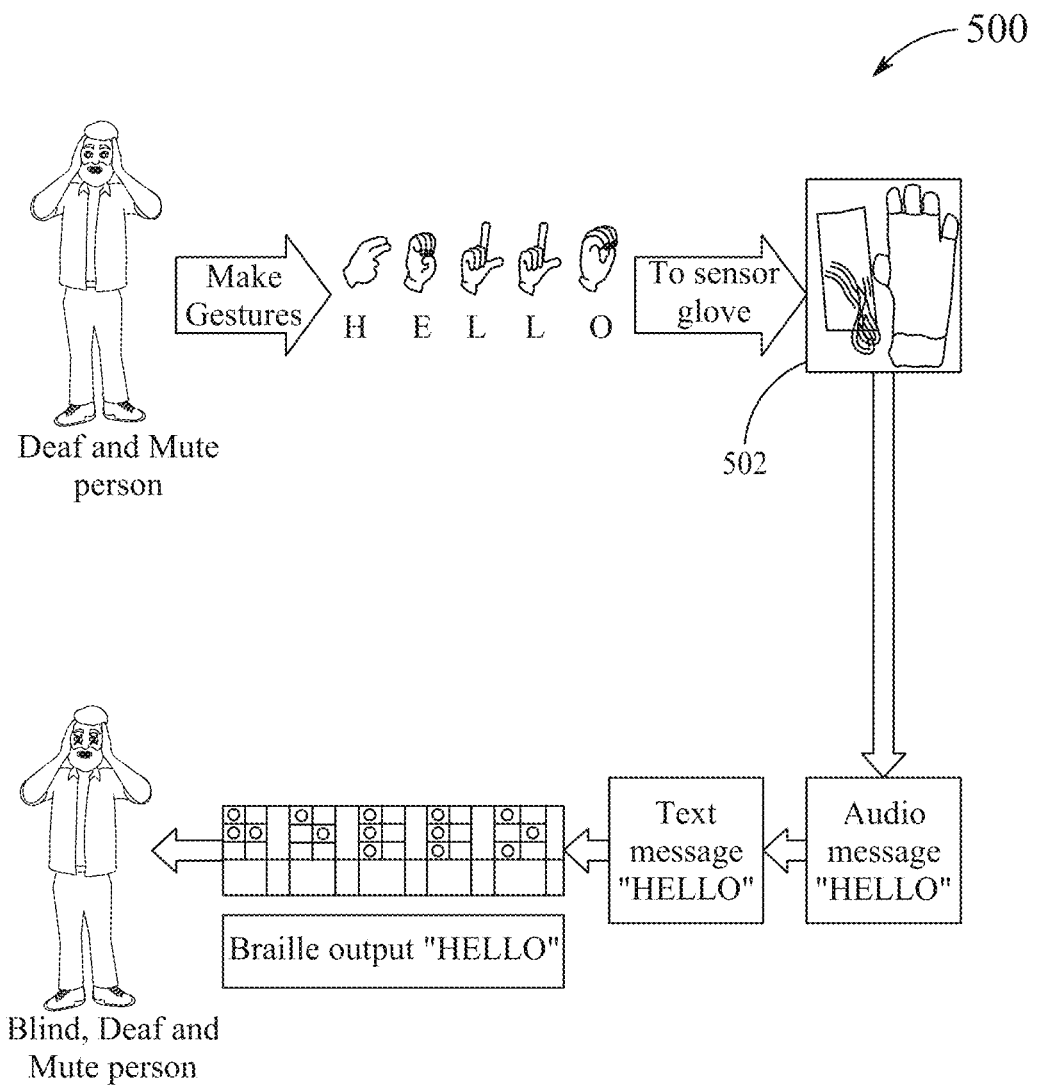
FIG. 5A illustrates a hearing impaired communication interpreter.
Figure 5B:
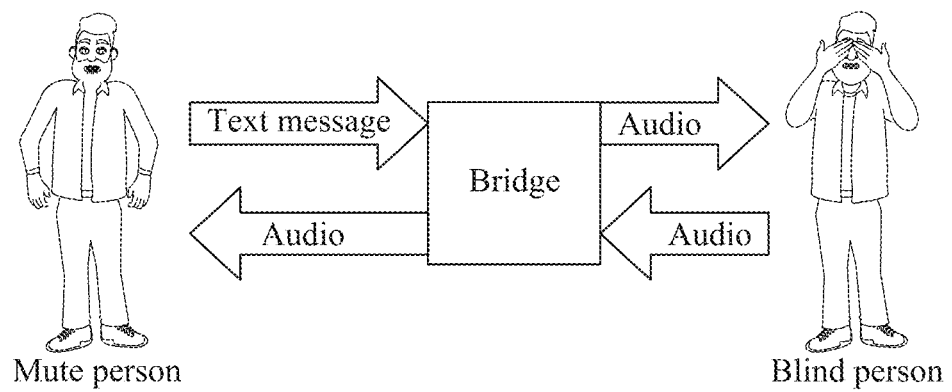
FIG. 5B illustrates a mobile application that provides a common communication platform for communication among blind, deaf and mute people.
Figure 5B:
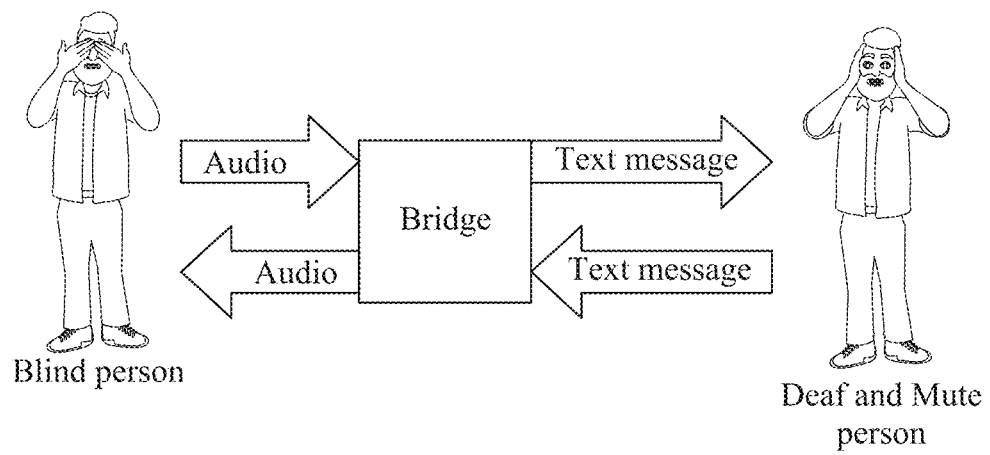
Figure 5C:
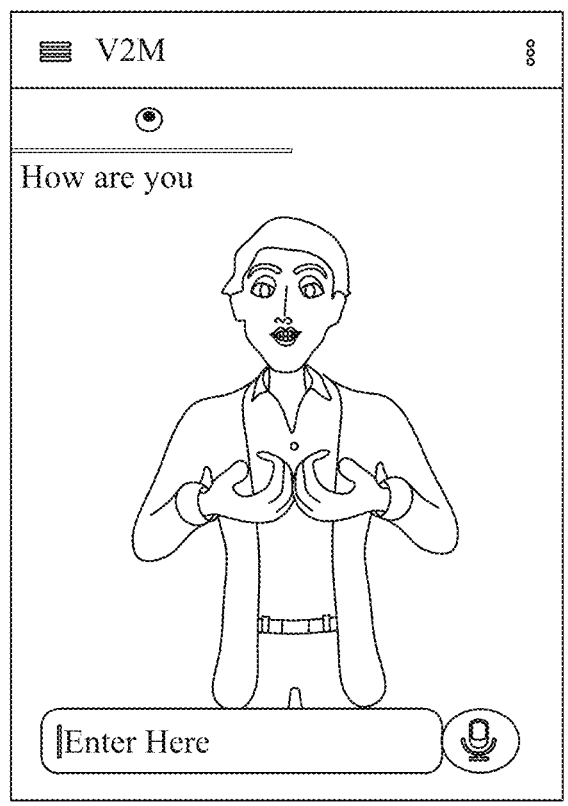
FIG. 5C is a user interface of the mobile application receiving a sign language and converting sign language to a speech.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system, method and a web application for articulation training for of hearing impaired individuals to improve their ability to articulate letters and words. The hearing impaired person may be presented with text including letters, numbers, words, or a script and read the letters, numbers, words or script aloud. The speech of the hearing impaired person is recorded and stored as a mel-frequency cepstral representation with the associated text in a database. A classifier is trained by the mel-frequency cepstral representations with associated text for a particular user. When the hearing impaired individual speaks, the system matches mel-frequency cepstral representations of their current speech with stored speech from the database and identifies the letters, numbers, words or script. The letters, numbers, words or reads script are then displayed on the screen. The computer application may provide a score representing how well the speech of the hearing impaired individual matched the speech of a non-hearing impaired individual. Further, the hearing impaired individual may learn to depend on verbal communication rather than sign language as they improved their articulation. This will allow him/her to communicate with others in his/her social life.

Figure 6:
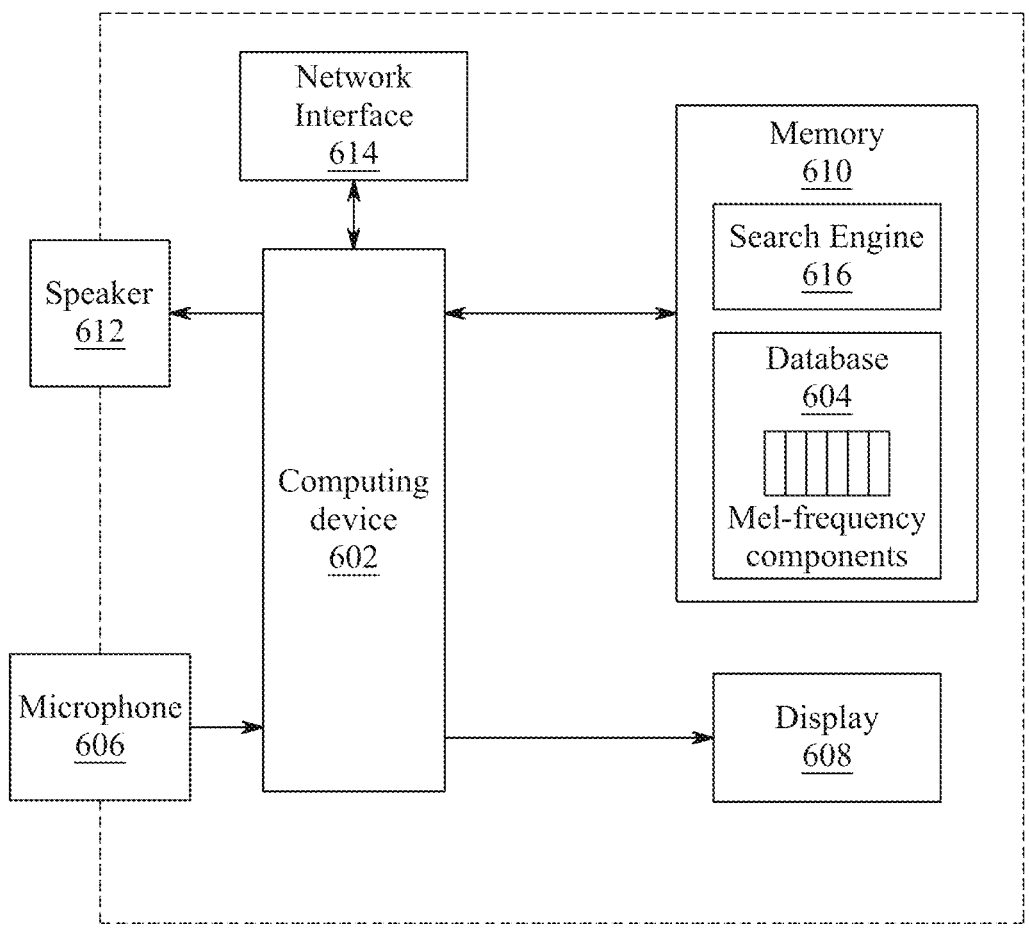
FIG. 6 is a block diagram of a system for articulation training for a hearing impaired person, according to certain embodiments.

FIG. 6 is an exemplary illustration of a system 600 configured to provide articulation training for a hearing impaired person. The system 600 includes a computing device 602, a database 604, a microphone 606, a display 608, a memory 610, a speaker 612, a network interface 614 and a search engine 616. The computing device 602 may be a processor or a controller configured to provide articulation training by executing process thereof. The computing device 602 may be a special-purpose processor or general-purpose processor. In some examples, the computing device 602 may include circuitry and program instructions stored therein to provide articulation training. The database 604 may be any database configured to store user data, audible inputs, mel-frequency cepstral coefficients (MFCC) of text and/or images related to audio recordings. The database 604 may be operated using, for example, structured query language (SQL) or such languages. The microphone 606 is any compatible microphone device configured to receive audible inputs. The microphone 606 may receive an audible input of the user while performing the articulation training or while updating the system 600 for the letters, words, text sentences or images. In some example implementations, the microphone 606 may include more than one microphone device. In one or more example implementations, the microphone 606 may be an embedded part of the system 600 or may be used as a separate unit coupled to the system 600 via a port through a wired or wireless connection. The display 608 is configured to display output such as text, images, video, indications, and/or such multi-media information. The display 608 is also configured to display the audible inputs in the form of readable letters, words, texts sentences or images. In an example, the display 608 may be a liquid crystal display (LCD), a light-emitting diode (LED) display or such display. In one or more example implementations, the display 608 may be an embedded part of the system 600 or may be used as a separate unit coupled to the system 600 through a wired or wireless connection. The display 608 is also configured to display inputs such as, audible inputs in the form of readable letters, words, texts sentences or images.

The memory 610 may include a computer-readable media on which an operating system, program data, an application (for example, a system application or a mobile web application) including program instructions for articulation training for hearing impaired persons, the database 604, services, routines, or other executable logic or instructions associated with articulation training process are stored. The speaker 612 may be any compatible speaker device configured to output audible output. In one or more example implementations, the speaker 612 may be an embedded part of the system 600 or may be used as a separate unit coupled to the system 600 through a wired or wireless connection. In one or more example implementations, the system 600 may include a network adaptor(s) 614 for connecting to a network. The system 600 may connect to a server or a cloud network to obtain training modules, receive program updates, upload training progress, process audio inputs, and/or perform articulation training. In one or more example implementations, the system 600 may include a search engine 616 configured to search the database 604 and an external database implemented in a remote server or a cloud device.

The computing device 602 is operatively connected to the database 604, the microphone 606, the display 608, the memory, and the speaker 612. The computing device 602 is configured to conduct articulation training for hearing impaired persons. The hearing impaired persons may be alternatively referred to as a user. For example, the articulation training process may be performed locally on the system 600, performed through a server or performed through a cloud network. The system 600 may be implemented in one or more forms. In one example implementation, the system 600 may be designed as an exclusive articulation device for articulation training. In another example implementation, the system 600 may be implemented in a computer. In another example implementation, the system 600 may be implemented in a mobile device such as a smartphone. In another example implementation, a web application associated with the articulation training used in the system 600 may be implemented in any general-purpose computer such as a desktop computer, a laptop, a smartphone, tablets, or any user equipment. The user may easily download the web-based application over his/her computational device and configure it for the articulation training. In an embodiment, the web-based application may refer to an application configured to run on an internet web browser. As such, using the computational device, the user may access a web browser for the web-based application for performing the articulation training. Accordingly, while performing the articulation training, the user may require the internet connectivity.

Figure 9B:
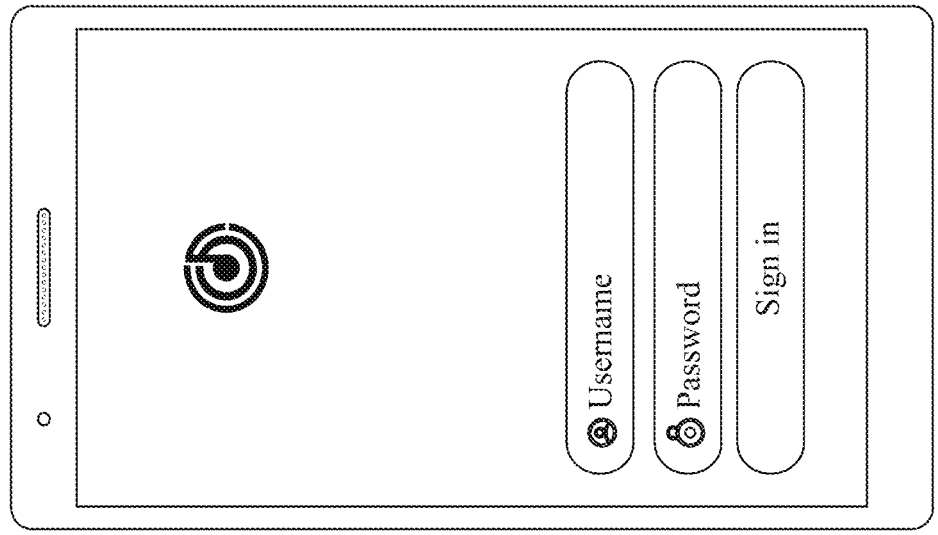
FIG. 9B illustrates an exemplary screenshot of a user interface of the web-based mobile application providing a user login page, according to certain embodiments.
Figure 9C:
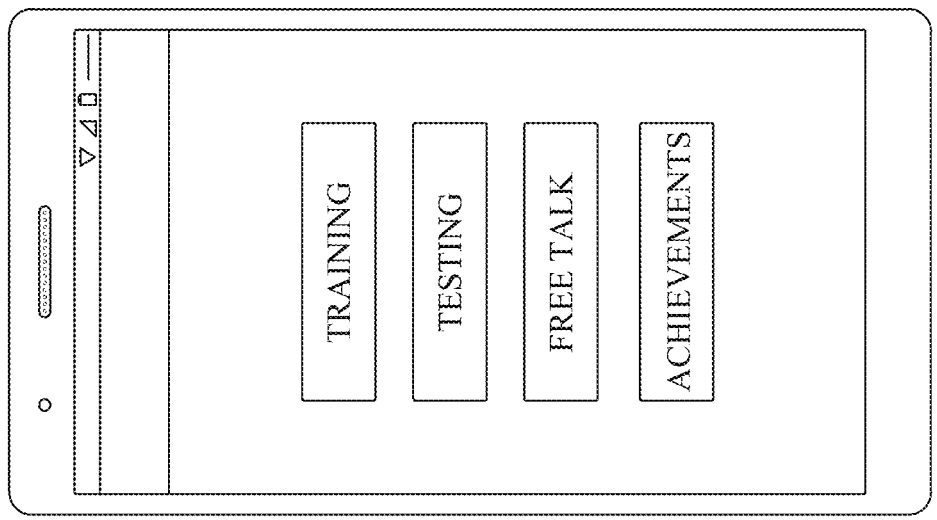
FIG. 9C illustrates an exemplary screenshot of a user interface of the web-based mobile application providing various operating modes for user selection, according to certain embodiments.
Figure 10B:
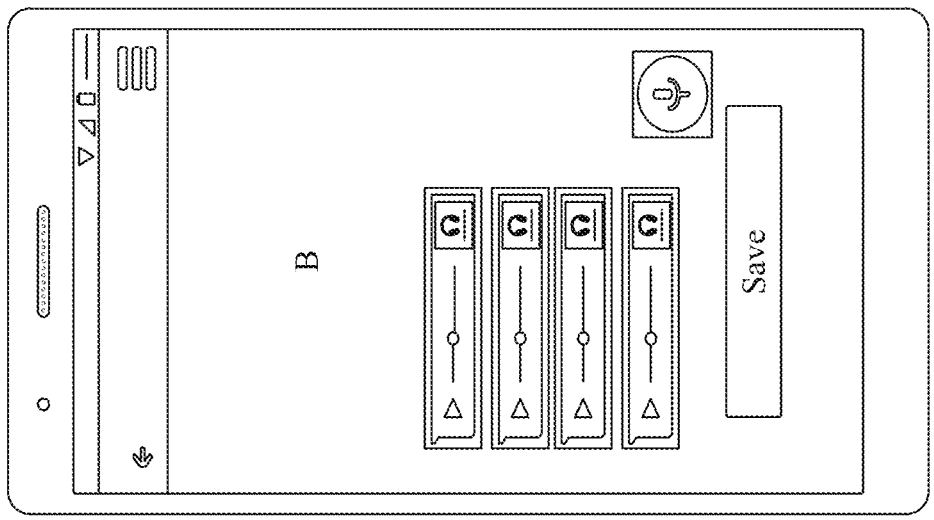
FIG. 10B illustrates an exemplary screenshot of a user interface of the web-based mobile application showing a recorded letter, according to certain embodiments.

The system 600 is configured to operate in four (4) modes that include a training mode, a testing mode, a free talk mode and an achievements mode. The training mode supports the user in articulation training. The testing mode supports the user in testing the articulation. The free talk mode supports the user in speaking with others when the system is sufficiently trained. The free talk mode supports the user in starting a conversation with a non-hearing impaired person, and can be used by both the user and non-hearing impaired person by displaying text on the display screen as the user or non-hearing impaired person speaks. The achievement mode supports the user in testing the pronunciation. To access the system 600, the user is optionally prompted to log in to begin (for example, as shown in FIG. 10B). On successful login, the computing device 602 may present the four modes on the display 608 (for example, as shown in FIG. 9C). The user may select a preferred mode among the four modes to begin usage of the system 600.

Figure 9D:
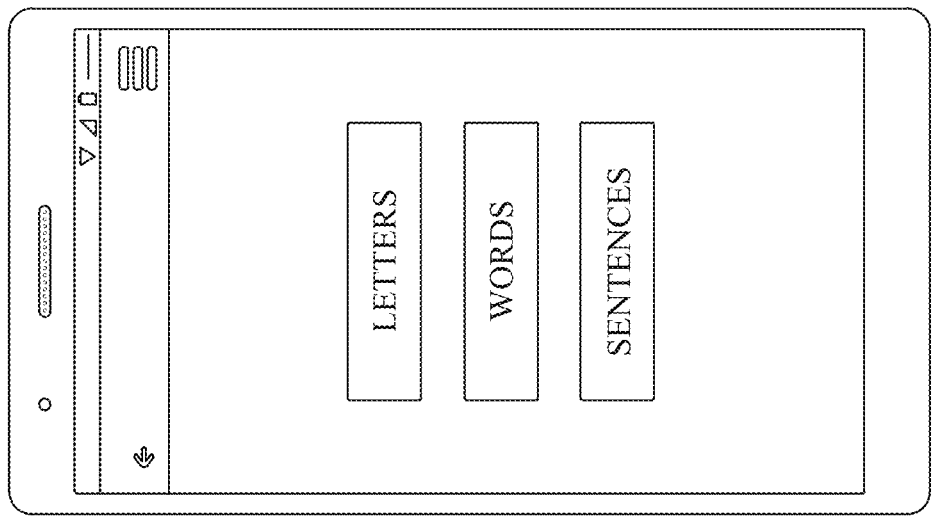
FIG. 9D illustrates an exemplary screenshot of a user interface of the web-based mobile application providing various options for user selection, according to certain embodiments.
Figure 10A:
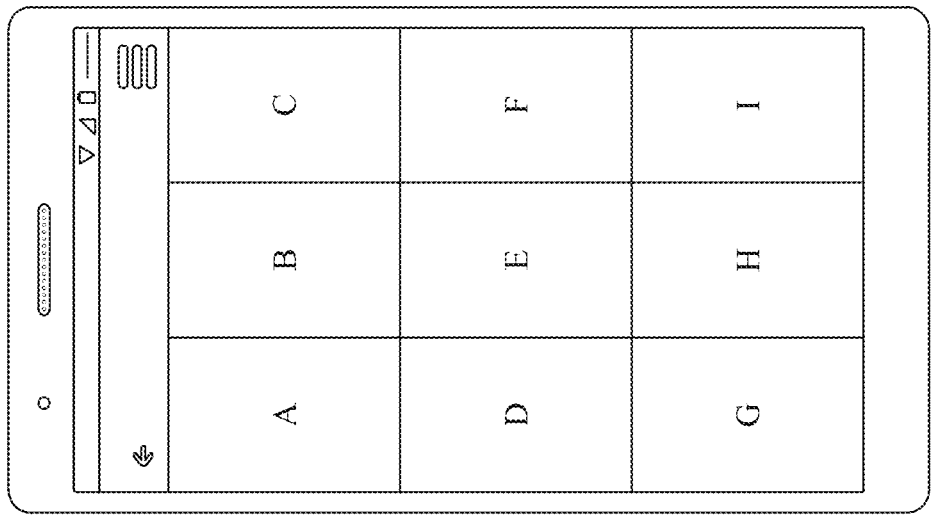
FIG. 10A illustrates an exemplary screenshot of a user interface of the web-based mobile application in a training mode, according to certain embodiments.

The computing device 602 may train the database 604 in the training mode. In response to selecting the training mode (for example, by selecting the "training" option shown in FIG. 9C), the computing device 602 actuates the display 608 to present options for the user to select for the articulation training. The options may include a letter, a word, a text sentence, and an image (for example, as shown in FIG. 9D). The user may select one of the options at a given time for the articulation training. Upon the user selecting one of the options, the computing device 602 provides one or more graphical icons relevant to the option on the display 608. For example, if the user selects a letter, the computing device 602 fetches and presents one or more letters as graphical icons on the display 608. In an example, the computing device 602 may display English letters such as "A", "B", "C", "D," etc. in the form of a matrix over the display 608 (for example, as shown in FIG. 10A). Alternatively, the computing device 602 may display Arabic words, or another language, which may be a setting on a home screen during user registration.

The computing device 602 may prompt the user to select one of the graphical icons. In response to a user selection of a graphical icon, the computing device 602 prompts the user to provide an audible input associated with the graphical icon. The computing device 602 activates the microphone 606 to receive the audible input from the user. The user may pronounce a letter, a word, a text sentence, or an image, based on the graphical icon to provide the audible input. The computing device 602 receives and records the audible input provided by the user associated with the chosen graphical icon presented on the display 608. In one or more example implementations, the computing device 602 may prompt the user to provide the audible input more than one time to record possible minor variations in pronunciation. In an example, the computing device 602 may prompt the user to provide the audible input for four (4) times. The computing device 602 records the audible input provided four times (for example, as shown in FIG. 10B). The computing device 602 may use the audible inputs provided by the user to train the database 604 to recognize the user's pronunciations in future instances. In an example, the computing device 602 may use a voice-recognition engine (not shown) to record, process, and associate the voice with the user, and store the audible input under a user profile. On receiving the audio input, the computing device 602 converts the audible input to a mel-frequency cepstral representation. In one example, the computing device 602 may use any known techniques to convert the audible input into mel-frequency cepstral coefficients that collectively make up mel-frequency cepstral representation. The mel-frequency cepstral representation may refer to a representation of a short-term power spectrum of an audio input, based on a linear cosine transform of a log power spectrum on a nonlinear mel-scale of frequency. One example expression to convert a normal frequency to the mel-scale of frequency may be provided by:

$$m = 2595 \log_{10}\left(1 + \frac{f}{700}\right),$$

wherein f represents a frequency component present in the received audible input. Processes for deriving the mel-frequency cepstral coefficients are known in the art and not discussed for the sake of brevity. The computing device 602 stores the current mel-frequency cepstral representation with stored mel-frequency cepstral representations in the database 604.

For example, the user provides an audible input by pronouncing the letter "A" after being prompted to do so, in response to the user choosing a graphical icon associated with the letter "A". The computing device 602 may record the audible input, convert the letter A into its corresponding mel-frequency cepstral representation, and store the mel-frequency cepstral representation of the word A in the database 604. In another example, the user may choose a word, such as the word "Hammer" and provide an audible input "Hammer" in response to being prompted to do so by the computing device 602. The computing device 602 converts the word "Hammer" into its corresponding mel-frequency cepstral representation and stores the mel-frequency cepstral representation of the word "Hammer" in the database 604. In another example, the user person selects a text sentence providing "I am ready", and provides audible input by pronouncing "I am ready" in response to the prompt by the computing device 602 to provide the audible input for the selected sentence. The computing device 602 converts this pronunciation "I am ready" into the corresponding mel-frequency cepstral representation and stores in the database 604. In another example, the user may choose an image, such as the image of "mother" and provide an audible input "mother" in response to being prompted to do so by the computing device 602. The computing device 602 converts the audible input "mother" into its corresponding mel-frequency cepstral representation and stores the mel-frequency cepstral representation of the image "mother" in the database 604. The example of associating the image with a corresponding audible input may be useful for training hearing impaired young children as they may not be able to read yet. Also, such training will empower the young children to speak at a young stage, enabling them to be integrated easily into the mainstream early on.

The computing device 602 may associate and store the user-chosen letter, word, text sentences or image with the plurality of the audible inputs and mel-frequency cepstral representations of the audible input corresponding to the chosen letter, word, text sentences or image provided by the user. The computing device 602 stores the plurality of the audible input and the associated mel-frequency cepstral representation of the audible input in the database 604 for future use, such as while performing the training or testing modes of the system 600. In some aspects, the computing device 602 may update the database 604 with updated mel-frequency cepstral representations of the audible input corresponding to the chosen letter, word, text sentences or image when the user practices providing the audible input to corresponding the chosen predefined letter, word, text sentences or image.

In some aspects, the computing device 602 may provide an option to the user to see the audible input the user has provided for the chosen letter, word, text sentence, or an image. On selection of the option by the user, the computing device 602 may display the letter, the word, the text sentence, or the image for which the user provided the audible input. Also, the computing device 602 may provide an option to the user to save or discard the audible input based on the user's satisfaction. The user may choose to repeat the training for the same chosen letter, word, a text sentence, or an image for better quality.

In some aspects, the computing device 602 may provide an option to the user to see the audible input the user has provided for the chosen letter, word, a text sentence, or an image, to understand whether they are correct or not. In some examples, the computing device 602 may calculate and provide accuracy of the user pronunciation.

Figure 11C:
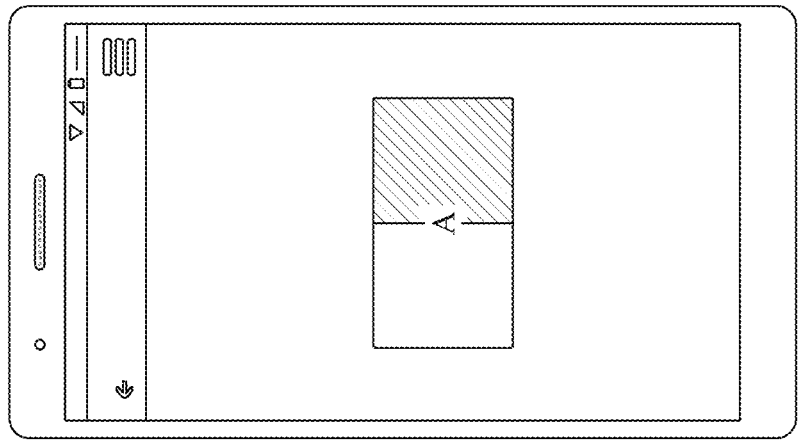
FIG. 11C illustrates an exemplary screenshot of a user interface of the web-based mobile application showing a success indicator, according to certain embodiments.
Figure 11B:
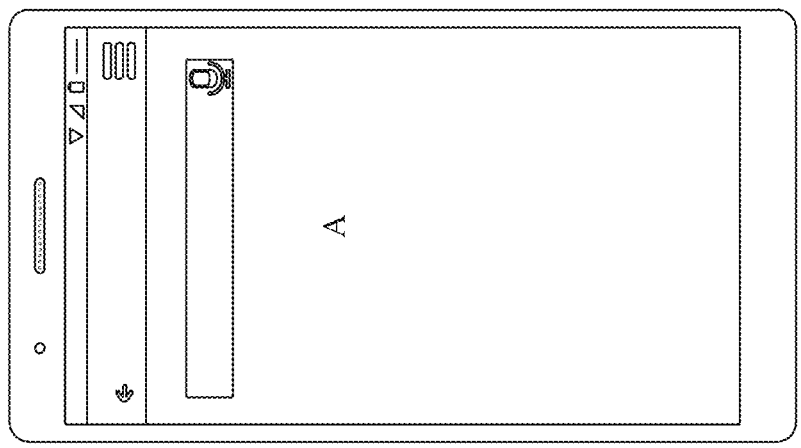
FIG. 11B illustrates an exemplary screenshot of a user interface of the web-based mobile application indicating a selection of a letter A, according to certain embodiments.
Figure 11A:
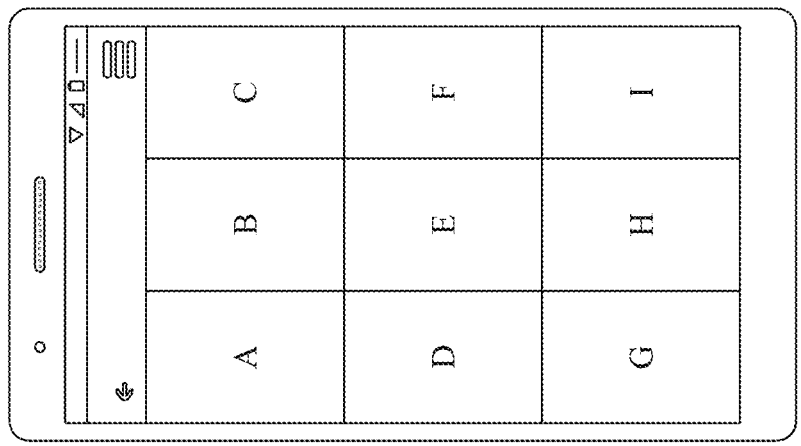
FIG. 11A illustrates an exemplary screenshot of a user interface of the web-based mobile application in a testing mode, according to certain embodiments.

The testing mode is designed to test the user. The user may initiate the testing mode by choosing the testing option (for example, by selecting "testing" option shown in FIG. 10C). In the testing mode, the computing device 602 provides options such as a letter, a word, a text sentence, and an image, for the user to choose for testing. In response to a selection of the option by the user, the computing device 602 may fetch and provide a plurality of graphical icons corresponding to the chosen option from the database 604. For example, if the user chooses a letter option, the computing device 602 fetches a plurality of letters corresponding to the letter option from the database 604. In an example, the computing device 602 may provide a plurality of letters, for example, English letters such as "A", "B", "C" etc., that are displayed in the form of a matrix on the display 608 (as shown in FIG. 11A).

The computing device 602 may prompt the user to select one of the graphical icons. In response to a user selection of a graphical icon, the computing device 602 prompts the user to provide an audible input associated with the user-selected graphical icon (as shown in FIG. 11B). Also, the computing device 602 activates the microphone 606 to receive the audible input from the user. The user may pronounce the letter to provide an audible input based on the selected graphical icon. The computing device 602 receives the audible input through the microphone 606. On receiving the audible input, the computing device 602 converts the audible input to a mel-frequency cepstral representation. The computing device 602 searches the database 604 using the search engine 616 to match the mel-frequency cepstral representation with stored mel-frequency cepstral representations stored in the database 604. The stored mel-frequency cepstral representations relate to the audible inputs provided by the user previously in connection with the selected graphical icon during training mode. In one or more example implementations, there may be more than one stored mel-frequency cepstral representation due to multiple recordings of audible inputs in the training mode. Accordingly, the computing device 602 matches the mel-frequency cepstral representation with stored mel-frequency cepstral representations stored in the database 604. In response to identifying the match, the computing device 602 displays a success indication on the graphical icon corresponding to the letter, the word, the text sentence, or the image. In examples, the success indication may include a pop-up window, a sliding text, a green color with a success message, and such indications, providing explicit confirmation of the match success to the user. If the match is not found, the computing device 602 displays a failure indication on the graphical icon corresponding to the letter, the word, the text sentence, or the image (for example, as shown in FIG. 11C). In examples, the failure indication may include a pop-up window, a sliding text, a red color with a failure message, and such indications, providing explicit confirmation of the match failure to the user.

Figure 13:
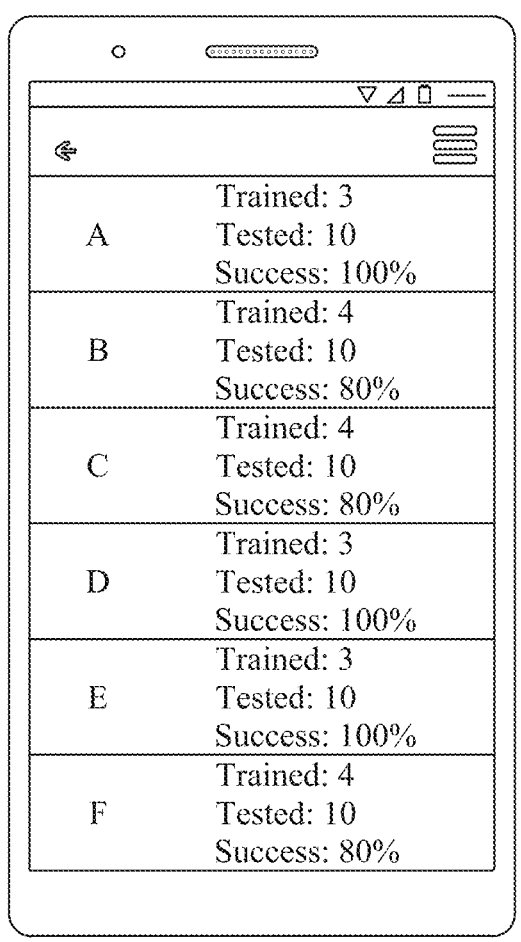
FIG. 13 illustrates an exemplary screenshot of a user interface of the web-based mobile application in an achievement mode, according to certain embodiments.

In an example testing mode, the user may select a letter "B" under the letter option. In response to the selection, the computing device 602 prompts the user to provide audible input associated with the letter B. The computing device 602 receives and converts the audible input into a mel-frequency cepstral representation. The computing device 602 may search the database 604 using the search engine 616 to match the mel-frequency cepstral representation associated with the audible input with the stored mel-frequency cepstral representation corresponding to the letter B in the database 604. In response to finding the match, the computing device 602 displays a success indication for example, by providing a light on the background of the letter and providing a pop-up having the text success indication (for example, as shown in FIG. 11C and FIG. 13).

In another example, in the testing mode, the user selects a word "Hello" under the word option. In response to the selection, the computing device 602 prompts the user to provide an audible input associated with the word "Hello". The computing device 602 receives and converts the audible input into a mel-frequency cepstral representation. The computing device 602 may search the database 604 using the search engine 616 to match the mel-frequency cepstral representation associated with the audible input with the stored mel-frequency cepstral representation corresponding to the word "Hello" in the database 604. In response to finding the match, the computing device 602 displays a success indication, such as for example, a green background to the display of the word hello.

In another example, in the testing mode, the user selects an image "cow" under the image option. In response to the selection, the computing device 602 prompts the user to provide an audible input associated with the image cow. The computing device 602 receives and converts the audible input into a mel-frequency cepstral representation. The computing device 602 may match the mel-frequency cepstral representation associated with the audible input with the stored mel-frequency cepstral representation corresponding to the image cow in the database 604. In response to finding the match, the computing device 602 displays a success indication on the display of the image cow.

In another example in the testing mode, the user selects a text sentence "how are you doing today?" under the image option. In response to the selection, the computing device 602 prompts the user to provide an audible input associated with the sentence. The computing device 602 receives and converts the audible input into a mel-frequency cepstral representation. The computing device 602 may match the mel-frequency cepstral representation associated with the audible input with the stored mel-frequency cepstral representation corresponding to the sentence in the database 604. In response to finding the match, the computing device 602 displays a success indication, such as an animated clapping hands next to the sentence.

During the articulation training, apart from displaying the words, letters, text sentences or images on the display 608 as they are received through the microphone 606, the system 600 may additionally be configured to output a sound of the words, letters, text sentences or images of the user. For example, the hearing impaired person tries to say a word "tree" but his/her pronunciation is not clear. However, due to the association of the corresponding image or text with the mel-frequency cepstral representation, the system 600 may understand the word and/or letter spoken by the hearing impaired person and the speaker 612 may yield the sound of "tree", useful for any other person communicating with the user.

The computing device 602 may support the user to test the spoken language through the free talk mode when the user is trained on articulating any letter, word, a text sentence, or an image. In response to selecting the free talk mode (for example, by selecting "free talk" option shown in FIG. 10C), the computing device 602 actuates the display 608 to prompt the user to speak a series of words naturally. The computing device 602 may activate the microphone to receive the series of words from the user.

The computing device 602 further actuates the display 608 to present a prompt asking the user to speak a series of words naturally. Also, in response to the prompt, the computing device 602 activates the microphone 606 to receive the audible input from the hearing impaired person. As the user speaks, the computing device 602 captures the audible input in the form of a series of words through the microphone 606. The computing device 602 converts the audible input of the first series of words of the hearing impaired person into a corresponding a first series mel-frequency cepstral representations. For example, the user pronounces "Hello everyone". The computing device 602 converts each word into its corresponding mel-frequency cepstral representations. For example, the computing device 602 may generate the mel-frequency cepstral representations (MFCR) as:

"Hello"—MFCR1, and
"everyone"—MFCR2.

The computing device 602 searches the database 604 for MFRC1 and MFCR2 using the search engine 616. The computing device 602 matches the equivalent representation of the letter and/or images associated with MFCR1 and MFCR 2 stored in the database 604 based on the mel-frequency cepstral representations of each word. For example, the computing device matches the mel-frequency cepstral representations of the spoken letter "Hello" and "everyone" with the stored mel-frequency cepstral representations in the database 604, which corresponds to the letters for the images of "Hello" and "everyone". Accordingly, when the computing device 602 finds a match for any or all the words, the computing device 602 displays the image and/or text of the corresponding letter, word, text sentence or image over the user display 608 with an indication of success or failure. Also, if the computing device 602 does not find a match, the computing device 602 may display "the search content does not exist" or "not found" or may display "It is a new word". Accordingly, as the user keeps on speaking, the computing device correspondingly displays the series of letters, words, text statements and/or images the display 608 alongside, based on the match.

In an aspect, the computing device 602 provides an option to the user to use the system 600 in a dual mode. In the dual mode, the computing device 602 captures and presents words, text sentences and images pronounced by another person who may be a non-hearing impaired people user. The computing device 602 may provide the dual mode option, when the user selects the free talk mode. For example, the computing device 602 may provide a button, a slider bar, a dialogue box, a menu etc., on the display 608 to choose the dual mode as soon as the user initiates the free talk mode. The dual mode is useful for the user as the user may not be able to sufficiently hear the spoken language from a different person during communication. Accordingly, the dual mode supports the user in understanding what the other person is speaking to him/her. In some examples, the computing device 602 may provide an option to turn-off the dual-mode anytime during the free talk mode.

When the dual mode is enabled, the computing device 602 is further configured to receive a second series of words from another person. The voice recognition engine may recognize a different voice and may mark the series of words as spoken by another person. For example, the another person may say "Pleasant weather". The computing device 602 may recognize that the audible input is from a different person based on processing by the voice recognition engine. The computing device 602 may convert the audible input of the second series of words from the second user into a corresponding mel-frequency cepstral representations and associates "Pleasant" with a MFCR3 and "Weather" with the MFCR4. The computing device 602 searches the database 604 for MFRC3 and MFRC4 using the search engine 616. The computing device 602 may match words associated with MFCR3 and MFCR4 stored in the database 604 based on the mel-frequency cepstral representations of each word. Also in some example implementations, The computing device 602 searches the database 604 using the search engine 616 for MFRC1 and MFCR2 in a server or cloud network to identify a match for the equivalent representation of the letter and/or images associated with MFCR1 and MFCR 2 stored in any data sources such as a central database or external database based on the mel-frequency cepstral representations of each word.

In response to finding the match for the words, the computing device 602 may display the image, text of the corresponding word, and/or text sentence on the user display 608. Also, when the computing device 602 does not find a match, the computing device 602 may display "the search content does not exist" or "not found" or may even display "It is a new word". Accordingly, as the second person continues to speak additional series of letters, words, text statements or images, the computing device 602 provides on the display 608 an appropriate match (if found) from the database 604. In an example, the computing device 602 may display the first series of words from the user the side-by side with the second series of words from the another person. Also, the computing device 602 may be configured to display the words spoken by both persons at the same time over the display 608. Also, if the computing device 602 does not find a match, the computing device 602 displays "the search content does not exist" or "not found" or may even display "It is a new word" for the second series of words. The dual mode is useful for the user for carrying out a conversation with another person who may be a non-hearing impaired person. For example, the user (for example, a hearing impaired person) may be trying to find directions to reach an address, but having difficulty conveying his/her questions due to speech which is not intelligible to others. In a non-limiting example, the user may speak to the system 600 through the microphone 606 that he is seeking an address. The computing device 602 may convert the user speech having a series of words (taken as audible input) to a mel-frequency representation input. The computing device 602 may search the database 604 using the search engine 616 for a match of each mel-frequency cepstral representation of the series of mel-frequency cepstral representations to a stored mel-frequency cepstral representation. In response to identifying a series of matches, the computing device 602 may provide the written text of the user's speech on the display for sharing with another person. The computing device 602 may capture the other person's response, convert the response to a mel-frequency representation input, search for a match of each mel-frequency cepstral representation of the series of mel-frequency cepstral representations to a stored mel-frequency cepstral representation, and provide an output to the user in a form of written words or images, or a combination of both.

The computing device 602 in the achievement mode may support the user's improvement and advancement in spoken language or check pronunciation fluency by performing a repetitive pronunciation of the letters, words, text sentences, and images based on the articulation training. In the achievement mode (initiated, for example, by selecting "achievements" option shown in FIG. 9C), the computing device 602 actuates the display 608 to present a prompt asking the user to provide a selection of one of the options including a letter, a word, a text sentence, and an image. In response to the selection of any one of the options, for example, a letter option, the computing device 602 may fetch and provide of predefined letters under the letter option from the database 604. The computing device may present a plurality of predefined letters, for example, English letters such as "A", "B", "C" etc., in the form of a matrix over the display 608. The user may choose any one predefined letter, such as for example, a letter "C". Once the user chooses any one predefined letter, the computing device prompts the user to provide a plurality of repetitions of the audible input for the selection. A number of repetitions of articulations are merely taken as example and is not restrictive. For example, the computing device 602 may notify the user to perform such repetitions for n number of times wherein the n=2, 3, 4, 5, etc. In an embodiment, n can be a user-defined number or the system 600 defined number. For example, based on an age of the person or based on the accuracy of the person over the pronunciation, the user, or the system 600 can decide and define to perform n repetitions. As such, for any person whose articulation efficiency is not accurate for a long time, the user may define to perform ten (10) repetitions. In another case, if a person has only a mild articulation problem, the user may be requested to perform only four (4) repetitions, sufficient to improve his/her fluency.

Once the user has completed the plurality of repetitions, the computing device 602 converts the plurality of repetitions of the audible input into a plurality of corresponding mel-frequency cepstral representations. As such, the computing device retrieves the database 604 to fetch the first audible input, second audible input, third audible input and so on for the chosen letter (for example, letter "C") and converts each of the first audible input, second audible input, third audible input into corresponding mel-frequency cepstral representations. The computing device 602 matches the mel-frequency cepstral representations of the letter "C" spoken by the user with the mel-frequency cepstral representations of the letter "C" stored in the database 604. Since, multiple pronunciations are made for the letter "C" at the time of the training mode, the computing device 602 may search the database 604 using the search engine 616 to match the mel-frequency cepstral representations of the letter "C" spoken by the user with the mel-frequency cepstral representations of the letter "C" stored in the database 604. In response to the match, the computing device 602 compares and displays, over the display 608, a success of a match. For example, the computing device 602 matches the mel-frequency cepstral representation of the first audible input with the stored mel-frequency cepstral representation for the letter "C" from the database 604 and calculates a first success matching rate. Similarly, the computing device 602 matches the mel-frequency cepstral representation of the second audible input with the stored mel-frequency cepstral representation for the letter "C" from the database 604 and calculates a second success matching rate. Further, the computing device 602 matches the mel-frequency cepstral representation of the third audible input with the stored mel-frequency cepstral representation for the letter "C" from the database 604 and calculates a third success matching rate.

In response to the computing device 602 completing the matching process and the success rate calculation, the computing device 602 displays a success rate for the plurality of mel-frequency cepstral representations of the audible input related to the letter "C". The computing device 602 may be configured to aggregate the success rates for the first audible input, second audible input, and the third audible input for the same letter "C" and finds a mean or an average. The success rate may be saved in the memory 610 for user's access to know his/her growth over the articulation efficiency. In response to the user's request or without the user's request, the computing device 602 may display the success rate on the display 608 in the form of a statistics or in a matrix form. For example, the computing device 602 may display the success rate as:

Letter "C"—Success rate 50%.

Similarly, the user may perform the achievement mode for plurality of other letters, words, text sentences, and/or images, in the achievement mode. Accordingly, the user of the device 100 may practice and understand a level of achievement of the articulation for him/her for any letter, word, text sentence or the image.

In another aspect, there may be a partial match between the mel-frequency representation of the audible input and stored mel-frequency cepstral representations. In such situations, the computing device 602 displays an indication of a degree of success of a match between the mel-frequency representation of the audible input and stored mel-frequency cepstral representations, to indicate the closeness of the user's speech is to an ideal pronunciation for that chosen letter, word, text sentence and/or image. In some examples, the indication of the degree of success includes any one of a sliding bar, a color intensity, a series of colors, a series of lights, a graph, a script, a histogram, and such indications. For example, the sliding bar may indicate a percentage of match success and a percentage of failure with the stored mel-frequency cepstral representations. In a non-limiting example, when a match is found, the display 608 may show the sliding bar with 90% match and 10% lack of a match. In another example, if a match is found, the display 608 may change the color intensity, such as a green color for 90% match and red color for 10% lack of match.

In an aspect, when a match is found, the computing device 602 is configured to store the mel-frequency cepstral representation of the audible input of the user with the stored mel-frequency cepstral representations in the database 604. For example, when an ideal match is found, the audible input is stored in the database 604 for statistical purposes In another example, when a partial match is found, with the audible input not being ideal or an average, the audible input is stored in the database 604 for statistical purposes. The computing device 602 may provide the user with statistics on the accuracy of his/her pronunciation and percentages indicating accuracy indicating his/her pronunciation. In another embodiment, the audible input is stored in the database 604 in order to update the database 604 with minor changes in the pronunciation. The computing device 602 may provide options to the user to repeat the testing mode as many times as the user wants to improve the pronunciation of the letters, the words, the text sentences, or the images.

Figure 7:
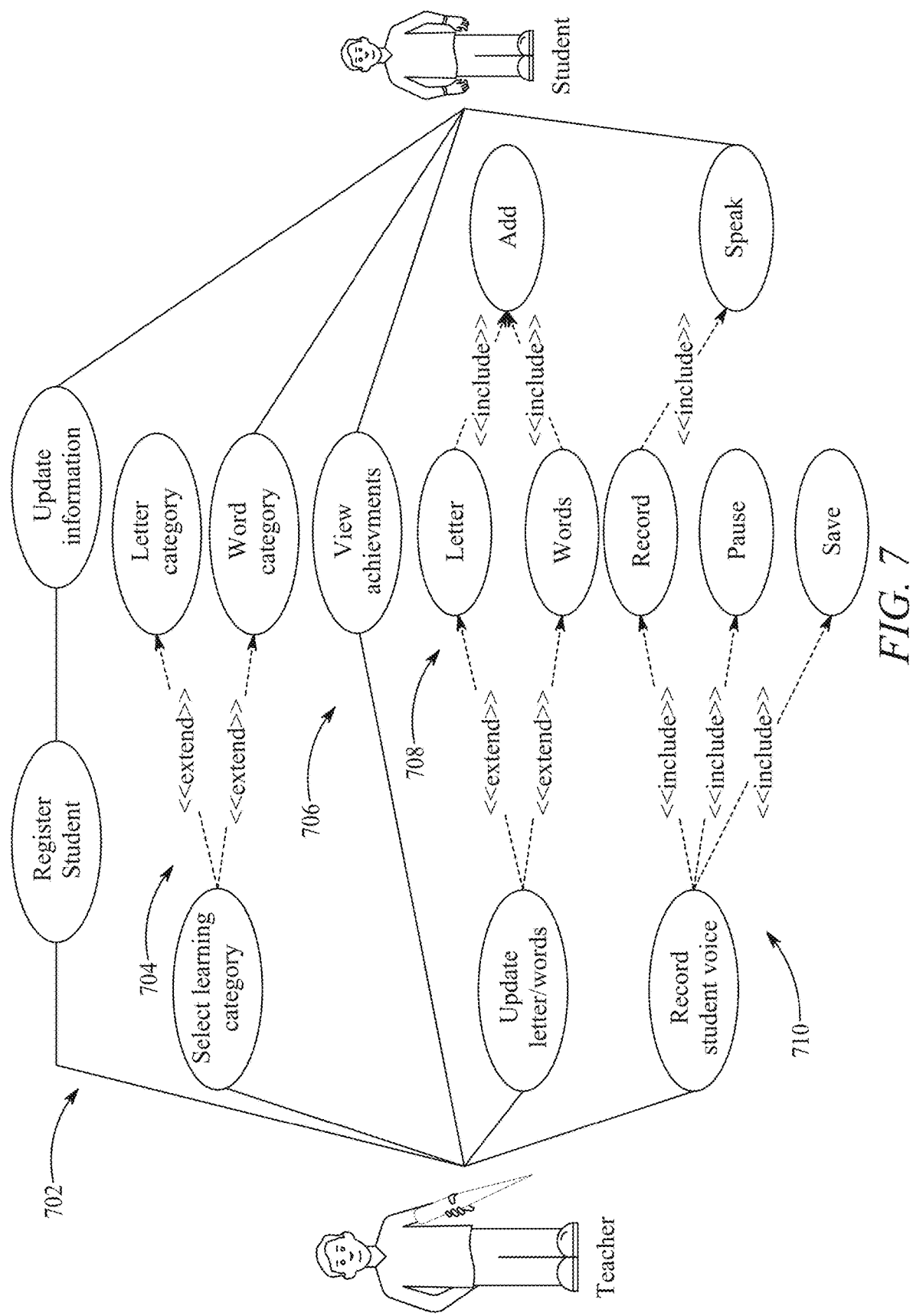
FIG. 7 is an exemplary illustration of a use case diagram providing a graphic depiction of interactions among various elements and users of the present disclosure, according to certain embodiments.

FIG. 7 is an exemplary illustration of a use case diagram providing a graphic depiction of the interactions among various elements and users of the system 600. In an example, the use case represents a methodology used in system analysis to identify, clarify, and organize system requirements. The use-case diagram shows a graphical overview of the system functions in terms of actors and their functions as use cases. Referring to FIG. 7, in a stage 702, which is a registration state, the user may be prompted by the system to provide his/her information and register accordingly before using the system 600 for articulation training. In some examples, the stage 702 may provide an option to update the user information. Once registered, a state 704 begins in which a training process begins on selecting learning category. The learning category is shown to be "extended" into letter and word categories. The term "extend" in the use case refers to a directed relationship that specifies how and when the behavior defined in the usually supplementary (optional) extending use case can be inserted into the behavior defined in the extended use case. A teacher (or a user) may provide learning categories for the user to select that may include a letter category, a word category, a text sentence category (not shown), an image category (not shown) and such categories. In stage 706, the user can check his/her achievements over the progress made for articulation training through the system 600. In stage 708, the learning may evolve to advanced stages, including updating letters, words, text sentences, images, and such categories. The user may also update new letters and/or terms and accordingly, their pronunciation learned in daily life. The user may also record and save his/her voice during the articulation training in stage 710. The stage 710 illustrates an extension of recording student voice to record case, pause case and save case.

Figure 8B:
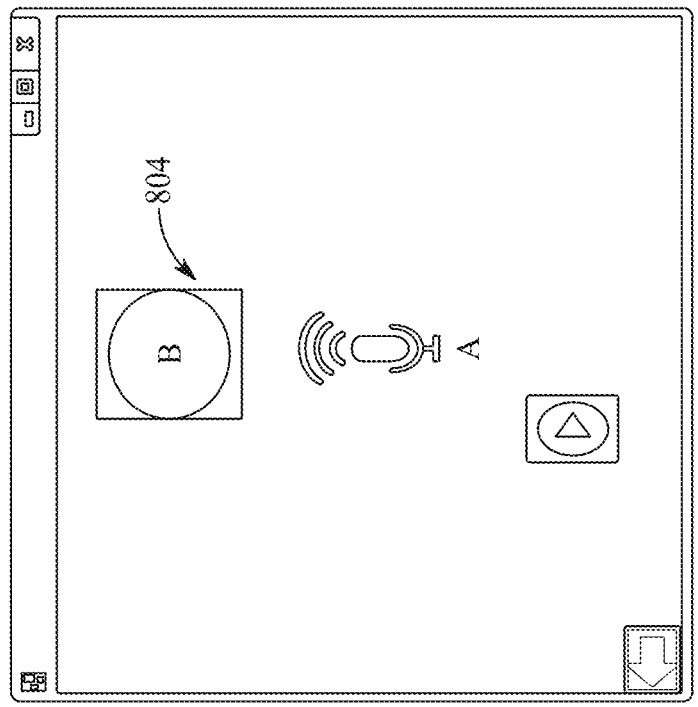
FIG. 8B illustrates an exemplary screenshot of a user interface showing the audible input that was recorded, according to certain embodiments.
Figure 8A:
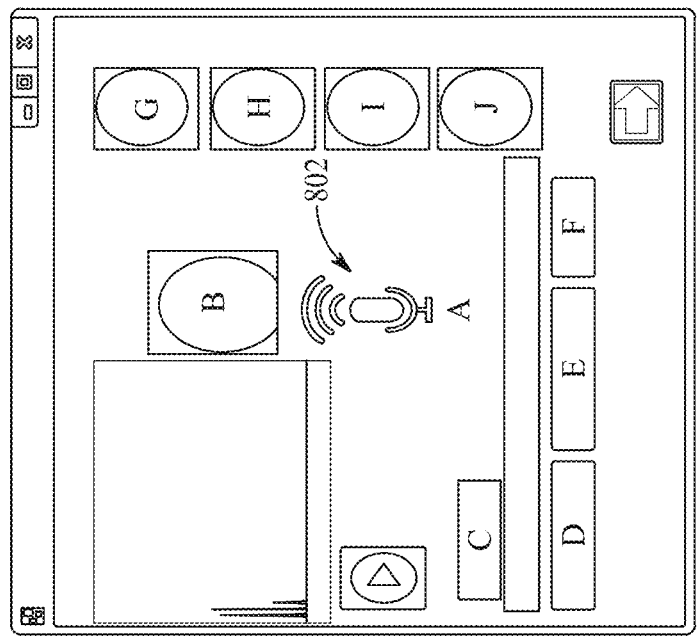
FIG. 8A illustrates an exemplary screenshot of a user interface of a web-based mobile application for articulation training, showing a recording of an audible input, according to certain embodiments.

FIG. 8A illustrates an exemplary screenshot of a user interface of a web-based mobile application for articulation training in which the audible input is being recorded. The screenshot of FIG. 8A shows a virtual microphone 802, which when clicked activates a microphone of the system 600 to receive the audible input. FIG. 8B illustrates an exemplary screenshot of a user interface of the web-based mobile application in which the audible input that was recorded is presented for listening. The screenshot of FIG. 8B shows a letter 804 that was recorded. The screenshot of FIG. 8B also shows a playback button which when clicked, plays the recorded audible input.

Figure 9A:
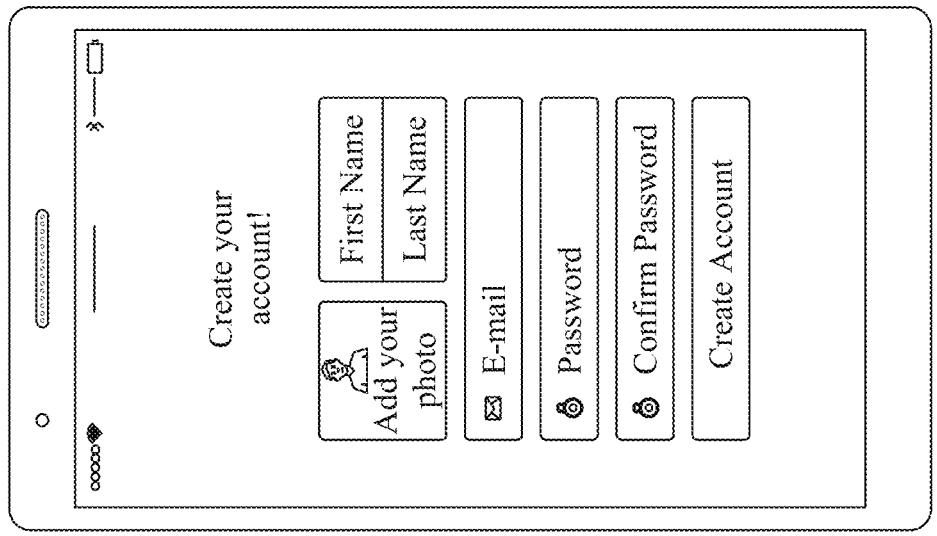
FIG. 9A illustrates an exemplary screenshot of a user interface of the web-based mobile application account registration page, according to certain embodiments.

FIG. 9A illustrates an exemplary screenshot of a user interface of the web-based mobile application for account registration. The screenshot of FIG. 9A shows options to provide registration information including input first name, last name, email ID, password, confirmation of password and a photo. The screenshot of FIG. 9A also shows an option to create account upon providing the required registration information and by clicking a create account button. FIG. 9B illustrates an exemplary screenshot of a login page user interface of the web-based mobile application seeking username and password to sign in. Although the screenshot illustrates a login in English, the system 600 can provide an option to login and train using a preferred language, such as Arabic, French, Chinese, Hindi, or the like.

FIG. 9C illustrates an exemplary screenshot of a user interface of the web-based mobile application that provides various modes for using the system 600 after the user login. The screenshot of FIG. 9C shows a training mode, a testing mode, a free talk mode, and an achievements mode. FIG. 9D illustrates an exemplary screenshot of a user interface of the web-based mobile application that provides various options for the user to select. The screenshot FIG. 9D shows a letter option, a words option and a text sentences option.

FIG. 10A illustrates an exemplary screenshot of a user interface of the web-based mobile application in the training mode. The screenshot of FIG. 10A shows that the user has chosen the training mode. The system has actuated the display 608 to show letters for the user to select, including A, B, C, D, E, F, G, H, and I. FIG. 10B illustrates an exemplary screenshot of a user interface of the web-based mobile application that shows a recorded letter. The screenshot shows that the user has chosen the letter B to record. The computing device 602 has made the user provide audible input of the letter B four times and has recorded the audible inputs. The screenshot of FIG. 10B illustrates the four recorded audible inputs in a playable format, which can be played by the user. The screenshot of FIG. 10B also illustrates an option to save the four recorded audible inputs to improve the ability of the classifier to match a current input to a stored mel-frequency cepstral representation in the database.

FIG. 11A illustrates an exemplary screenshot of a user interface of the web-based mobile application in the testing mode. The screenshot of FIG. 11A is a result of the user choosing the testing mode and further selecting the letters option. The system 600 has actuated the display 608 to show letters for the user to select one of the letters among A, B, C, D, E, F, G, H, and I. FIG. 11B illustrates an exemplary screenshot of a user interface of the web-based mobile application that shows that the user has selected the letter A. The screenshot of FIG. 11B illustrates a virtual microphone which when clicked by the user allows providing the audible input associated with the letter A. FIG. 11C illustrates an exemplary screenshot of a user interface of the web-based mobile application that shows that the audible input provided is correct by providing a green light at the background of letter A (for example, a right box behind the letter showing a green light). In case if the audible input provided is incorrect, the computing system 602 may provide a red light at the background of letter A (for example, a left box behind the letter A showing a red light).

Figure 12A:
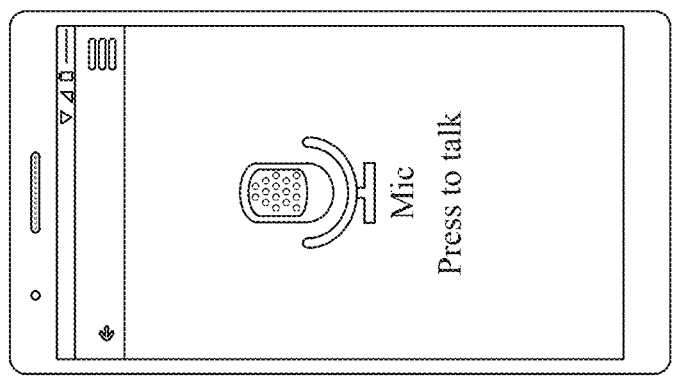
FIG. 12A illustrates an exemplary screenshot of a user interface of the web-based mobile application in a free talk mode, according to certain embodiments.
Figure 12B:
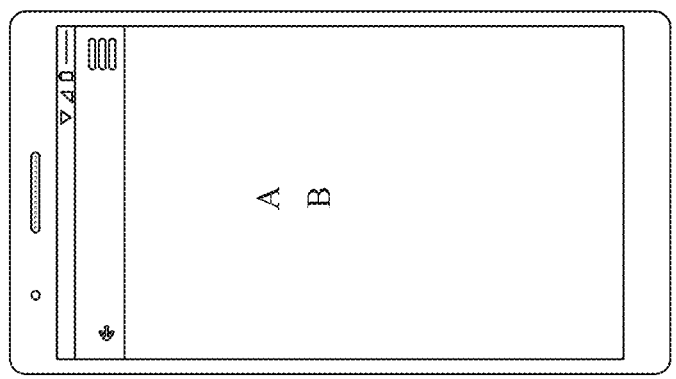
FIG. 12B illustrates an exemplary screenshot of a user interface showing letters found in a database matching an audible input provided by the user, according to certain embodiments.
Figure 12C:
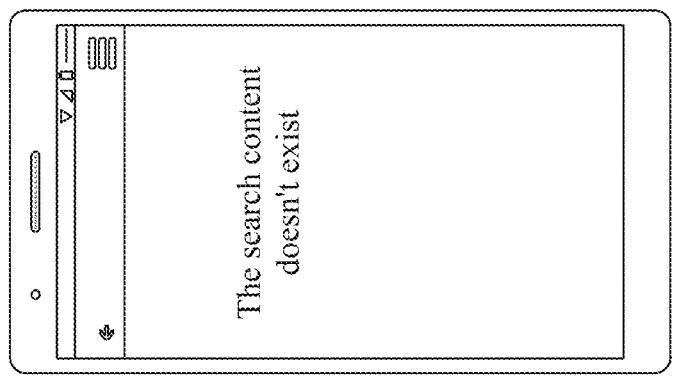
FIG. 12C illustrates an exemplary screenshot of a user interface indicating that the audible input provided by the user is not found in the database, according to certain embodiments.
Figure 12D:
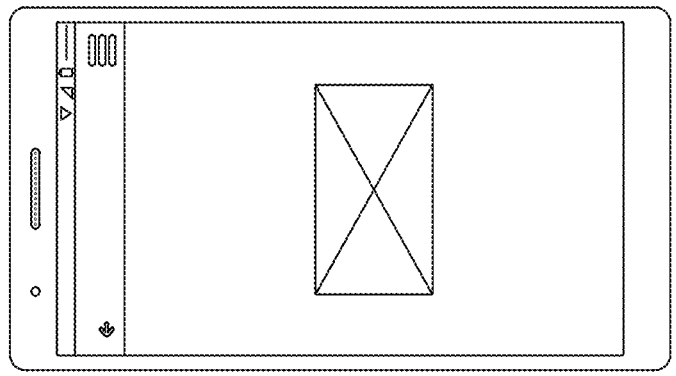
FIG. 12D illustrates another exemplary screenshot of a user interface graphically indicating that the audible input provided by the user is not found in the database, according to certain embodiments.

FIG. 12A illustrates an exemplary screenshot of a user interface of the web-based mobile application in the free talk mode. The screenshot is a result of the user choosing the free talk mode. The screenshot of FIG. 12A illustrates a virtual microphone on the display 608, which when actuated, receives an audible input from the user. FIG. 12B illustrates an exemplary screenshot of a user interface that shows the letters found in the database 604 that matched audible input provided by the user, which is letter A and letter B. FIG. 12C illustrates an exemplary screenshot of a user interface that illustrates that the audible input provided by the user is not found in the database 604. FIG. 12D illustrates another exemplary screenshot of a user interface indicating that the audible input provided by the user is not found in the database 604.

FIG. 13 illustrates an exemplary screenshot of a user interface of the web-based mobile application in the achievements mode. In response to the web-based application completing the matching process and the success rate calculation, the web-based application displays a success rate for the plurality of mel-frequency cepstral representations of the audible inputs. As illustrated, the screenshot shows the achievements for each of the letters for which the audible input is tested by the user. The screenshot shows a success rate of 100% for letter "A", for which the user trained three times and tested ten times. Similarly, the screenshot shows success rate of 80% for letter "B", for which the user trained four times and tested ten times.

The system 600 as described is configured able to analyze new words, according to the letters that the users had learned before. In some implementations, the system 600 allows the user to select the desired category among the existing categories on the home page (i.e., learn, test, talk), or (i.e., letters, words, sentences, etc.). In some implementations, the system 600 allows the user to select the desired word from the suggested words. In some implementations, the system 600 allows the user to update letters/words and save them in the database 604. In some implementations, the system 600 allows the user to quit the program and return to the homepage any time during the execution and from any page. In some implementations, the system 600 displays the picture of the letter as the user trains and speaks.

In some implementations, the system 600 is configured to be easily used by the user and requires fewer physical or intellectual skills to learn. In order to achieve this goal, the system 600 follows the principle of having a simple, easy-to-use, well-structured, friendly graphical user interface (GUI), that provides an easy navigation through the pages. In some implementations, the performance of the system 600 is fast and efficient and the system 600 is available for the user in a real time. In some implementations, a system response time is designed to be fast enough to satisfy the needs of a student while learning.

In some implementations, the system 600 may be secured from external threats. In some implementations, the system 600 may be accurate and configured to improve and ease all the system processes i.e., displaying the right letters. In some implementations, the system 600 is designed to be flexible for future expansions or updates and configured to adapt to any additional future changes in activities. In other words, the system components may be modified to include more changes and features, allow adding new features without disturbing the core functionality. The system 600 helps the users in developing and improving the spoken language. Importantly, the system 600 supports the user in communicating with the non-hearing impaired people in a spoken language, thereby supporting the integration of the user with the mainstream of society.

The first embodiment is illustrated with respect to FIGS. 1-13. The first embodiment describes the system 600 for articulation training for hearing impaired persons. The system 600 includes the database 604 including stored mel-frequency cepstral representations of audio recordings associated with text and/or images related to the audio recordings, the microphone 606 configured to receive audible inputs, the display 608 and a computing device 602 operatively connected to the database 604, the microphone 606, and the display 608. The computing device 602 includes circuitry and program instructions stored therein which when executed by one or more processors, cause the system 600 to receive an audible input from the microphone 606, convert the audible input to a mel-frequency cepstral representation, search the database 604 for a match of the mel-frequency cepstral representation to a stored mel-frequency cepstral representation, and display the text and/or images related to the stored mel-frequency cepstral representation when the match is found.

The computing device 602 is further configured to present the first prompt on the display 608 asking the user to select of one of a letter, a word, a text sentence and an image, present a second prompt on the display 608 asking the user to provide the audible input associated the letter, the word, the text sentence or the image selected, display a success indication on the display 608 of the letter, the word, the text sentence or the image when a match to the audible input is found, and display a fail indication on the display 608 when a match is not found.

The computing device 602 is further configured to store the mel-frequency cepstral representation with the stored mel-frequency cepstral representations in the database 604 when the match is found.

The system 600 further includes the memory 610. The memory 610 is configured with a mobile web application including the program instructions.

The computing device 602 is further configured to actuate the display 608 to present a first prompt asking the user to enter a first selection from one of: a training mode, a testing mode, a free talk mode, and an achievements mode.

The computing device 602 is further configured to actuate the display 608 to present a second prompt asking the user to provide a second selection of one of a letter, a word, a text sentence and an image, present a third prompt asking the user to provide the audible input for the second selection; and store the mel-frequency cepstral representation of the audible input for the second selection with the stored mel-frequency cepstral representations in the database 604 when the first selection is the training mode.

The computing device 602 is further configured to actuate the display 608 to present a second prompt asking the user to provide a second selection of one of a letter, a word, a text sentence and an image, present a third prompt asking the user to provide the audible input for the second selection, and present an indication on the display 608 an indication of a degree of success of a match between the mel-frequency representation of the audible input and the text or the one of the images when the first selection is the testing mode.

The indication of the degree of success includes any one of a sliding bar, a color intensity, a series of colors, a series of lights, a graph, a script, and a histogram.

The computing device 602 is further configured to actuate the display 608 to present a second prompt asking the user to speak a first series of words naturally, convert the first series of words to a first series of mel-frequency cepstral representations, search the database 604 using the search engine 616 for a match of each mel-frequency cepstral representation of the first series of mel-frequency cepstral representations to a stored mel-frequency cepstral representation, and present the first series of words on the display 608 as the user speaks when the first selection is the free talk mode.

The computing device 602 is further configured to receive, by the microphone 606, a second series of words from a second user, convert the second series of words to a second series of mel-frequency cepstral representations, search the database 604 using the search engine 616 for a match of each mel-frequency cepstral representation of the second series of mel-frequency cepstral representation to a stored mel-frequency cepstral representation, and present the second series of words on the display 608 as the second user speaks, wherein the second series of words are displayed side-by-side with the first series of words.

The computing device 602 is further configured to actuate the display 608 to present a second prompt asking the user to provide a second selection of one of a letter, a word, a text sentence and an image, present a third prompt asking the user to provide a plurality of repetitions of the audio input for the second selection, convert the plurality of repetitions of the audible input to a plurality of mel-frequency cepstral representations, and display a success rate for the plurality of mel-frequency cepstral representations of the audible input related to the text or image selected when the second selection is the achievements mode.

The second embodiment is illustrated with respect to FIGS. 1-13. The second embodiment describes a method for articulation training for hearing impaired persons. The method includes receiving an audible input, converting the audible input to a mel-frequency cepstral representation, searching for a match of the mel-frequency cepstral representation to a stored mel-frequency cepstral representation, and displaying the text and/or images related to the stored mel-frequency cepstral representation when the match is found.

The method further includes storing the mel-frequency cepstral representation with the stored mel-frequency cepstral representations when the match is found.

The method further includes presenting a first prompt to enter a first selection from one of a training mode, a testing mode, a free talk mode, and an achievements mode.

The method further includes presenting a second prompt to provide a second selection of one of a letter, a word, a text sentence, and an image, presenting a third prompt to provide the audible input for the second selection, and storing the mel-frequency cepstral representation of the audible input for the second selection with the stored mel-frequency cepstral representations in the database 604 when the first selection is the training mode.

The method further includes presenting a second prompt to provide a second selection of one of a letter, a word, a text sentence, and an image, presenting a third prompt to provide the audible input for the second selection, and presenting on the display 608 an indication of a degree of success of a match between the mel-frequency representation of the audible input and the stored mel-frequency cepstral representation when the first selection is the testing mode.

The method further includes presenting a second prompt to speak a first series of words naturally, converting the first series of words to a first series of mel-frequency cepstral representations, searching for a match of each mel-frequency cepstral representation of the first series of mel-frequency cepstral representations to a stored mel-frequency cepstral representation, and presenting the first series of words on the display 608 as the first series of words are spoken when the first selection is the free talk mode.

The method further includes presenting a second prompt to provide a second selection of one of a letter, a word, a text sentence and an image, presenting a third prompt to provide a plurality of repetitions of the audio input for the second selection, converting the plurality of repetitions of the audible input to a plurality of mel-frequency cepstral representations, and displaying a success rate for the plurality of mel-frequency cepstral representations of the audible input related to the text or image selected when the second selection is the achievements mode.

The third embodiment is illustrated with respect to FIGS. 1-13. The third embodiment describes a mobile web application for articulation training for hearing impaired persons. The mobile web application includes program instructions, which when stored in the memory 610 of the computing device 602 including circuitry, a database 604, and a microphone 606 and which, when executed by one or more processors, cause the mobile web application to receive an audible input from the microphone 606, convert the audible input to a mel-frequency cepstral representation, search the database 604 for a match of the mel-frequency cepstral representation to a stored mel-frequency cepstral representation, cause the computing device 602 to display the text and/or images related to the stored mel-frequency cepstral representation and store the mel-frequency cepstral representation with the stored mel-frequency cepstral representations in the database 604 when the match is found.

The mobile web application is further configured to cause the computing device 602 to display a success indication on the display 608 of the text and/or images when a match to the audible input is found, and display a fail indication on the display 608 when a match is not found.

Figure 14:
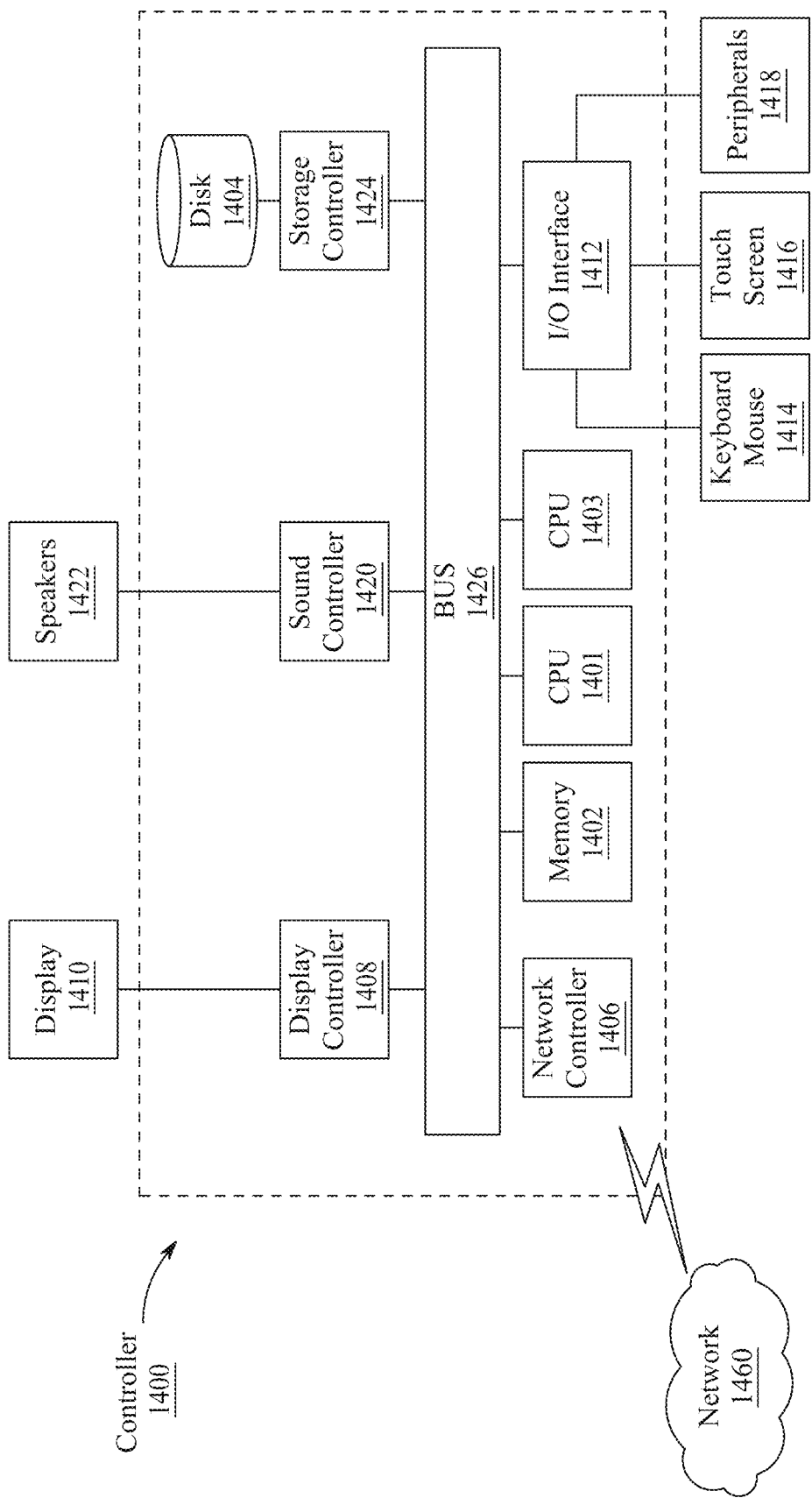
FIG. 14 is an illustration of a non-limiting example of details of computing hardware used in the computing device, according to aspects of the present disclosure.

Next, further details of the hardware description of the computing environment according to exemplary embodiments is described with reference to FIG. 14. FIG. 14 is an illustration of a non-limiting example of details of computing hardware used in the computing system, according to exemplary aspects of the present disclosure. In FIG. 14, a controller 1400 is described which is a computing device (for example, the computing device 602) and includes a CPU 1101 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 7, UNIX, Solaris, LINUX, Apple MAC-OS, and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general-purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
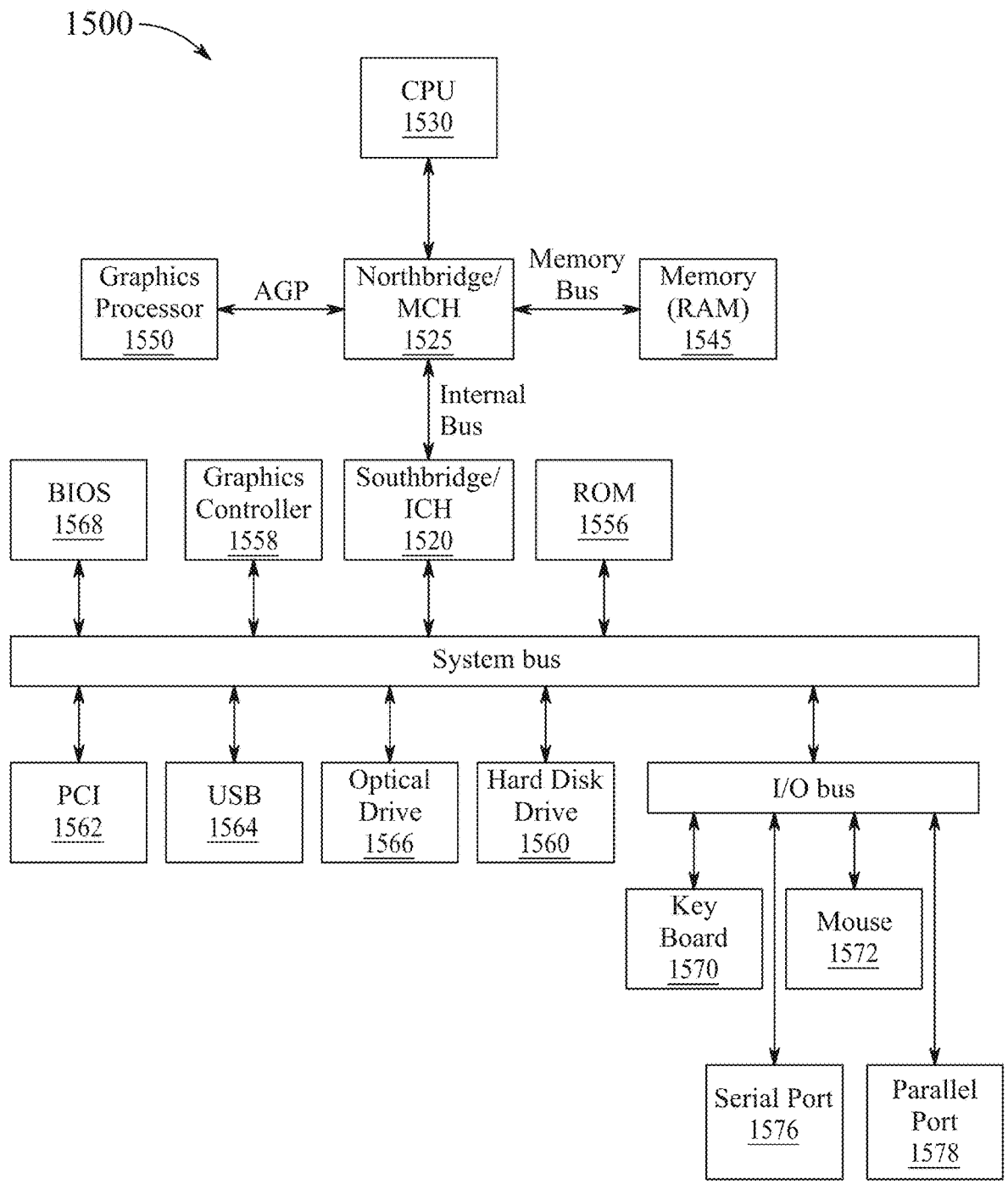
FIG. 15 is an exemplary schematic diagram of a data processing system used within the computing device, according to aspects of the present disclosure.

FIG. 15 shows a schematic diagram of a data processing system 1500 used within the computing system, according to exemplary aspects of the present disclosure. The data processing system 1500 is an example of a computer in which code or instructions implementing the processes of the illustrative aspects of the present disclosure may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
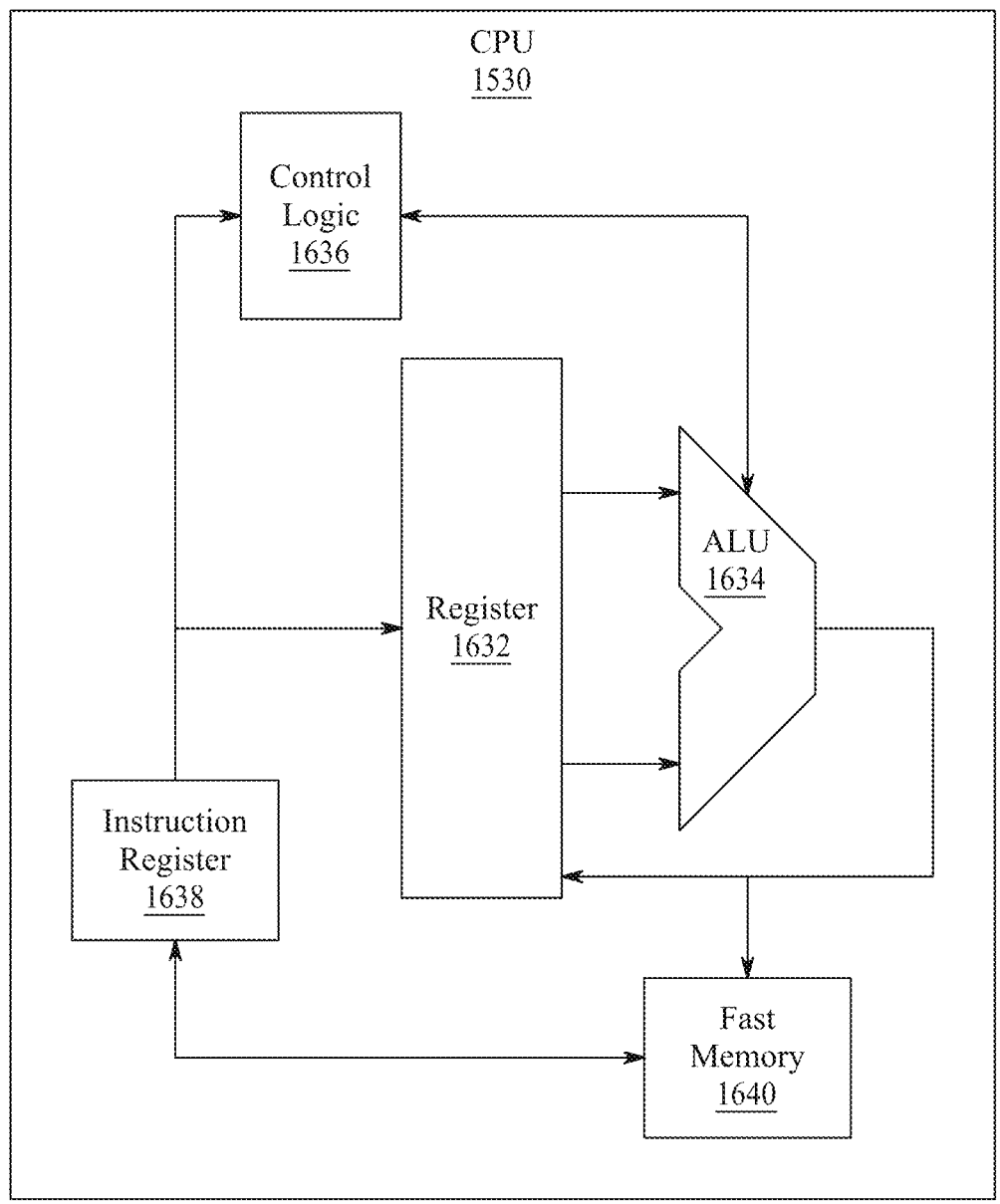
FIG. 16 is an exemplary schematic diagram of a processor used with the computing device, according to aspects of the present disclosure.
Figure 17:
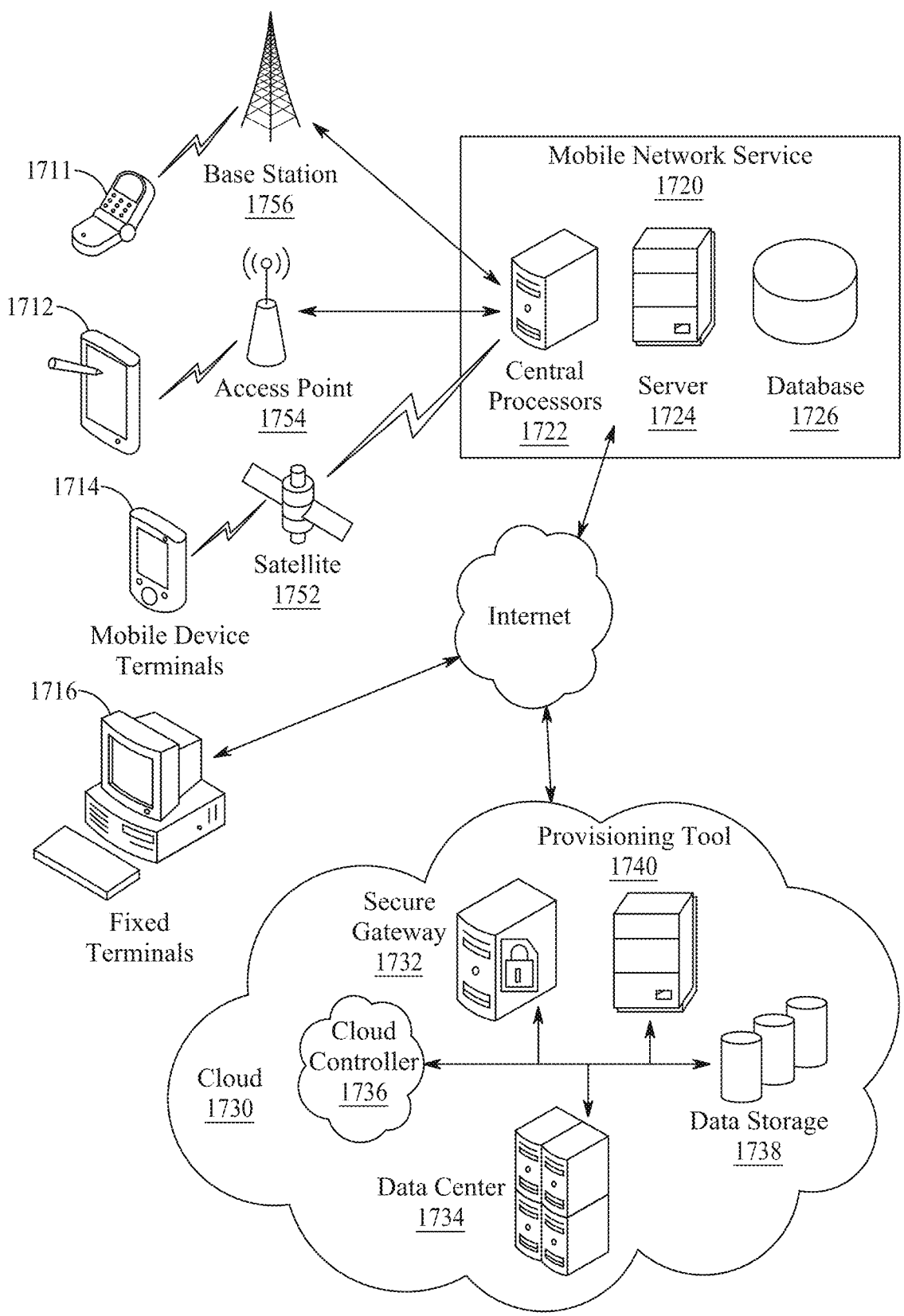
FIG. 17 is an illustration of a non-limiting example of distributed components that may share processing with the controller, according to aspects of the present disclosure.

For example, FIG. 16 shows one aspects of the present disclosure of CPU 1530. In one aspects of the present disclosure, the instruction register 1638 retrieves instructions from the fast memory 1640. At least part of these instructions is fetched from the instruction register 1638 by the control logic 1636 and interpreted according to the instruction set architecture of the CPU 1530. Part of the instructions can also be directed to the register 1632. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain aspects of the present disclosures, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1520 through a PCI bus 1562.

The PCI devices may include, for example, Ethernet adapters, add-in cards, and PC cards for notebook computers. The Hard disk drive 1560 and CD-ROM 1556 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1560 and optical drive 1566 can also be coupled to the SB/ICH 1520 through a system bus. In one aspects of the present disclosure, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. For example, letters, words, text sentences may refer to a plurality of letters used worldwide such as English letters, Arabic letters, Roman letters, Hindi letters, German letters, Spanish letters, or any letters known in the art. The type of letters used in the present invention is merely exemplary and is not restrictive. Also, the system, method and the web application disclosed in the present invention may be configured to execute speech in any established language. Moreover, the present disclosure is not limited to the specific circuit elements described herein, nor is the present disclosure limited to the specific sizing and classification of these elements. The above-described hardware description is a non-limiting example of corresponding structure for performing the functionality described herein.

The invention claimed is:

1. A system for articulation training for hearing impaired persons, comprising:
   a database including stored mel-frequency cepstral representations of audio recordings associated with text and/or images related to the audio recordings;
   a microphone configured to receive audible inputs;
   a display;
   a computing device operatively connected to the database, the microphone and the display, the computing device including circuitry and program instructions stored therein which when executed by one or more processors, cause the system to:
   receive an audible input from the microphone;
   convert the audible input to a mel-frequency cepstral representation;
   search the database for a match of the mel-frequency cepstral representation to one of the stored mel-frequency cepstral representations;
   display the text and/or images related to the stored mel-frequency cepstral representation when the match is found,
   actuate the display to present a first prompt asking a user to enter a first selection from one of:
      a training mode;
      a testing mode;
      a free talk mode; and
      an achievements mode,
   actuate the display to present a second prompt asking the user to speak a first series of words naturally;
   convert the first series of words to a first series of mel-frequency cepstral representations;
   search the database for a match of each mel-frequency cepstral representation of the first series of mel-frequency cepstral representations to one of the stored mel-frequency cepstral representations;
   present the first series of words on the display as the user speaks when the first selection is the free talk mode;
   receive, by the microphone, a second series of words from a second user;

convert the second series of words to a second series of mel-frequency cepstral representations;

search the database for a match of each mel-frequency cepstral representation of the second series of mel-frequency cepstral representation to one of the stored mel-frequency cepstral representations; and present the second series of words on the display as the second user speaks, wherein the second series of words are displayed side-by-side with the first series of words.

2. The system of claim 1, wherein the computing device is further configured to store the mel-frequency cepstral representation with the stored mel-frequency cepstral representations in the database when the match is found.

3. The system of claim 1, further comprising:

a memory, wherein the memory is configured with a mobile web application including the program instructions.

\* \* \* \* \*